United States Patent

[11] 3,630,079

| [72] | Inventors | John Mark Hughes<br>Dallas;<br>David Raynold Reinhartsen, Richardson,<br>both of Tex. |
|---|---|---|
| [21] | Appl. No. | 819,508 |
| [22] | Filed | Mar. 27, 1969 |
| [45] | Patented | Dec. 28, 1971 |
| [73] | Assignee | Texas Instruments Incorporated<br>Dallas, Tex. |

[54] NAVIGATION METHOD AND APPARATUS UTILIZING MULTIPLE SENSORS
20 Claims, 36 Drawing Figs.

[52] U.S. Cl. ................................................ 73/178, 33/226
[51] Int. Cl. ................................................ G01c 23/00
[50] Field of Search ................................................ 73/178; 340/27; 235/150.27; 343/100 ST; 33/226, 226 Z, 204, 61

[56] References Cited
OTHER REFERENCES

Keats, " A Navigation System Using Distance and Direction Measurements from a Satellite," Navigation, Vol. 11, No. 3, Autumn, 1964. pages 335 to 341.

Casserly et al., " The Potential Use of Satellites In Hyperbolic Position Finding," Navigation, Vol. 13, No. 4, Winter 1966–1967, pages 353–366

*Primary Examiner*—Donald O. Woodiel
*Attorneys*—James O. Dixon, Andrew M. Hassell, Harold Levine, Melvin Sharp and Rene' E. Grossman ABSTRACT: The disclosure is directed to a navigation system for a vessel including a radio navigation system for generating signals representative of the absolute position of the vessel. A second independent system utilizing radio signals from an orbiting satellite also generates signals representative of the absolute position of the vessel. Other sensors including an acoustic doppler, navigation unit, a water speed indicator and a gyrocompass generate signals which can be combined to produce a signal representative of the position of the vessel relative to a reference location. A computer combines each of the signals according to certain weighting functions in order to generate a resultant output signal which to a minimum mean squared error sense provides extremely accurate and reliable position information for the vessel.

(N) INDICATES THE NUMBER OF SATELLITE FIXES WHICH ARE EMPLOYED

INVENTORS:
JOHN M. HUGHES
DAVID R. REINHARTSEN

INVENTORS
JOHN M. HUGHES
DAVID R. REINHARTSEN

NAVIGATION METHOD AND APPARATUS UTILIZING MULTIPLE SENSORS

This invention relates to navigation methods and apparatus, and more particularly to accurate and consistent navigation for a geophysical prospecting vessel.

It is extremely important to provide accurate and consistent position information to vessels conducting marine seismic exploration. A large number of techniques have been heretofore employed in an effort to provide the necessary high accuracy and reliability needed for such seismic exploration navigation, but such techniques have not been generally satisfactory due to such factors as lack of accuracy, range limitations or unreliability because of weather conditions and the like.

For instance, shore-based radio navigation systems require precisely located shore-based stations which are expensive to install and maintain. Moreover, such shore-based radio navigation systems are subject to severe propagation variables and lane ambiguity problems, as well as having a limited range. Other navigation systems have encompassed the use of gyrocompasses and water speed indicators which are subject to drift, and acoustic doppler systems which cannot be satisfactorily utilized in deep water. Satellite navigation systems have lately been proposed, but such systems generally provide only periodic position information, thus presenting time intervals without available updated navigation information.

In accordance with the present invention, a plurality of different navigational and sensor components are included in a single navigation system and are combined in a manner to maximize the favorable characteristics of each component and to minimize the unfavorable characteristics of each component. A resultant navigational output is then computed to provide extremely accurate and highly reliable position indications of a geophysical prospecting vessel in all weather and in around-the-clock operation.

In accordance with another aspect of the invention, a plurality of sensors generate signals representative of different relative and absolute navigation data. Each of the signals are weighted according to preselected or computed criteria, and the weighted signals are combined to take advantage of the accuracy and advantages of each signal. A resultant navigational signal is then generated in response to the combination of the signals.

In accordance with a more specific aspect of the invention, a radio navigation system generates signals representative of the absolute or relative position of the vessel. Radio signals from an orbiting satellite are periodically received to generate a signal representative of the absolute position of the vessel. A plurality of sensors such as a water speed sensor, a gyrocompass and an acoustic doppler system generate signals representative of the speed and heading of the vessel. Circuitry is provided which is responsive to each of the signals to generate a resultant navigational output indicative of the absolute position of the vessel.

In accordance with other aspects of the present invention, a navigation system is provided which utilizes a plurality of sensors which provide both absolute and relative navigational information. The outputs of the sensors are combined to generate a resultant output having a far better accuracy and reliability than any one of the sensors. The resultant output can then be utilized in recalculation computations to further increase the accuracy of the navigation. The outputs of the sensors are weighted according to weighting factors which are varied in accordance with measurement-error statistics determined by the system. Due to the multisensor nature of the navigation system, consistent navigation information is provided in all weather and at all times by utilizing sensor outputs which are not seriously affected by particular adverse weather or other physical environmental conditions. Additionally, the data provided by the sensors may be compared, and inaccuracies of an output due to equipment failure or other external influence may then be determined, and that output processed or eliminated accordingly. The present system operates on a substantially real-time basis, thereby leading to more accurate determination of the location of seismic exploration operations by enabling a greater amount of data to be used to determine the location.

For a more complete understanding of the present invention and for further objects and advantages thereof, reference is now made to the following description taken in conjunction with the accompanying drawings, in which.

Figure 10:
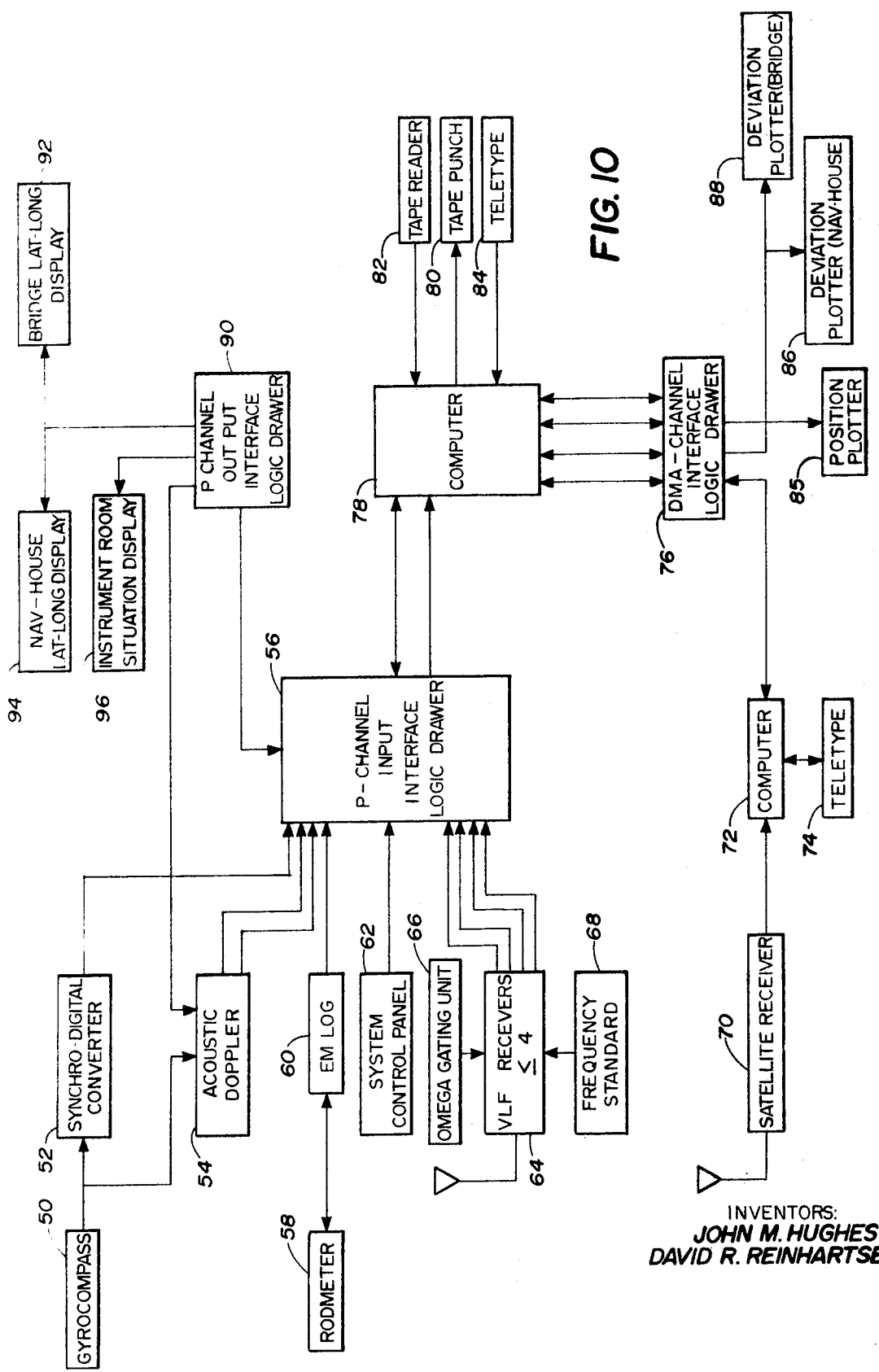
FIG. 10 is a block diagram of the preferred five-sensor embodiment of the invention.
Figure 30:
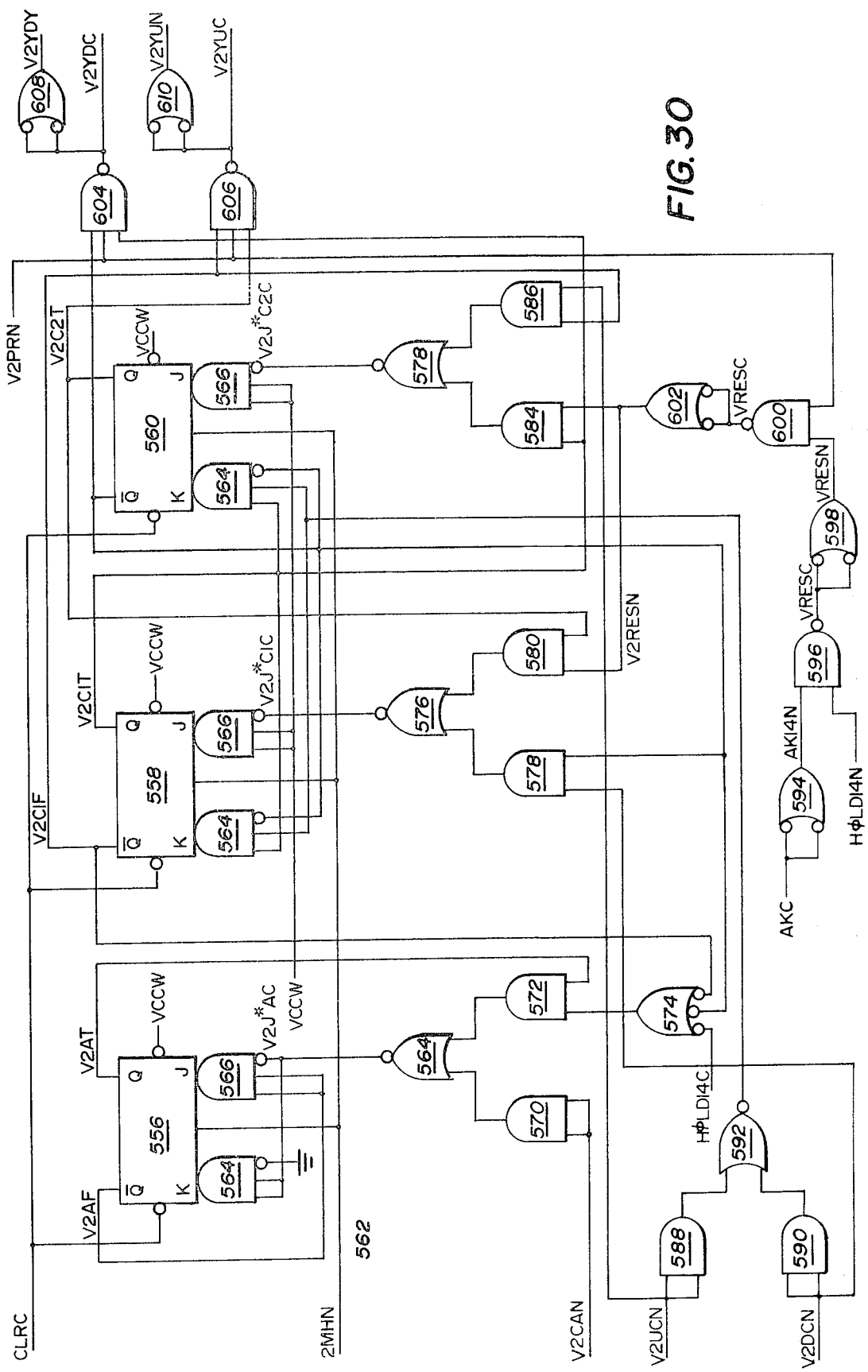
Figures 31, 32:
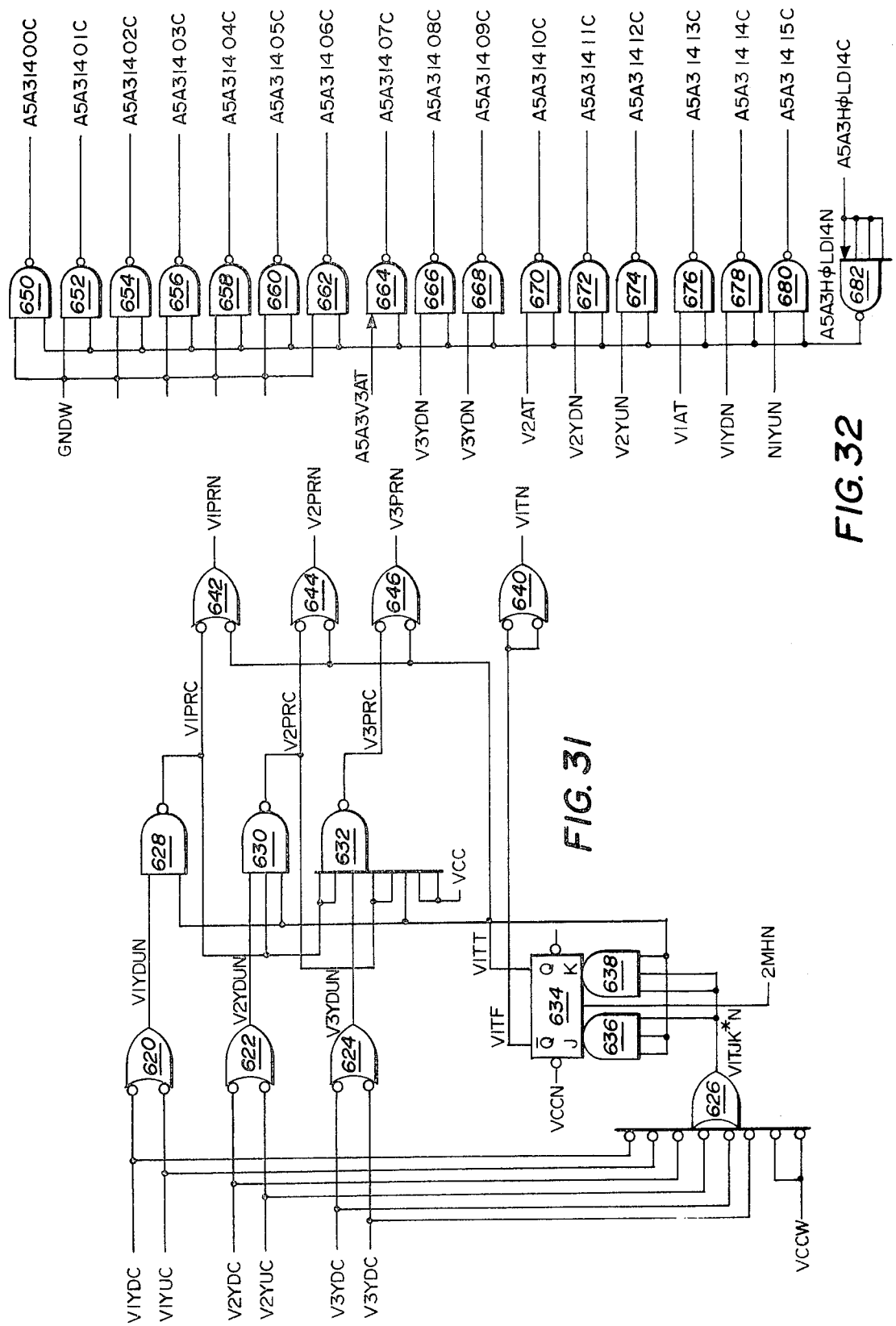
Figure 33:
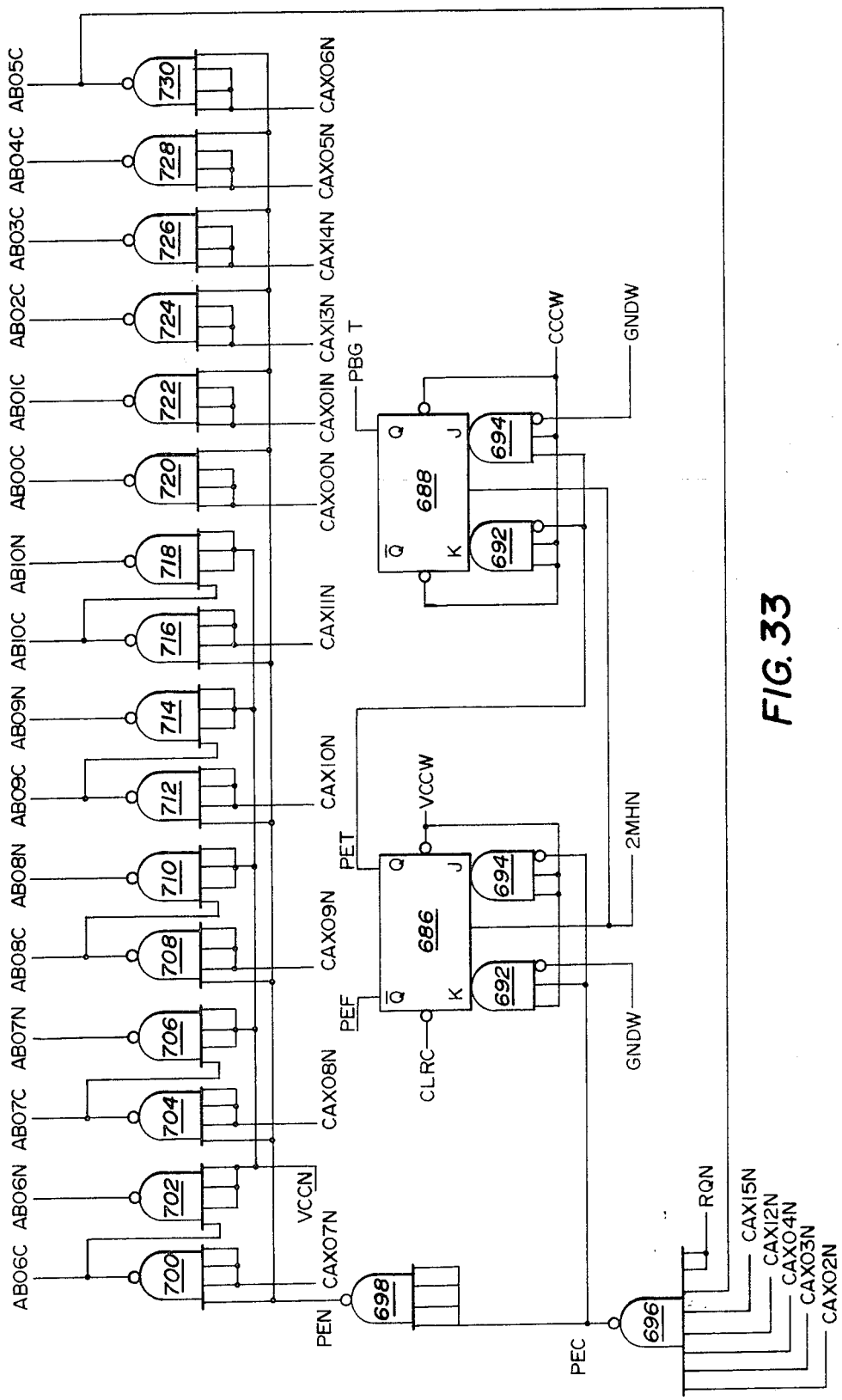
Figure 34:
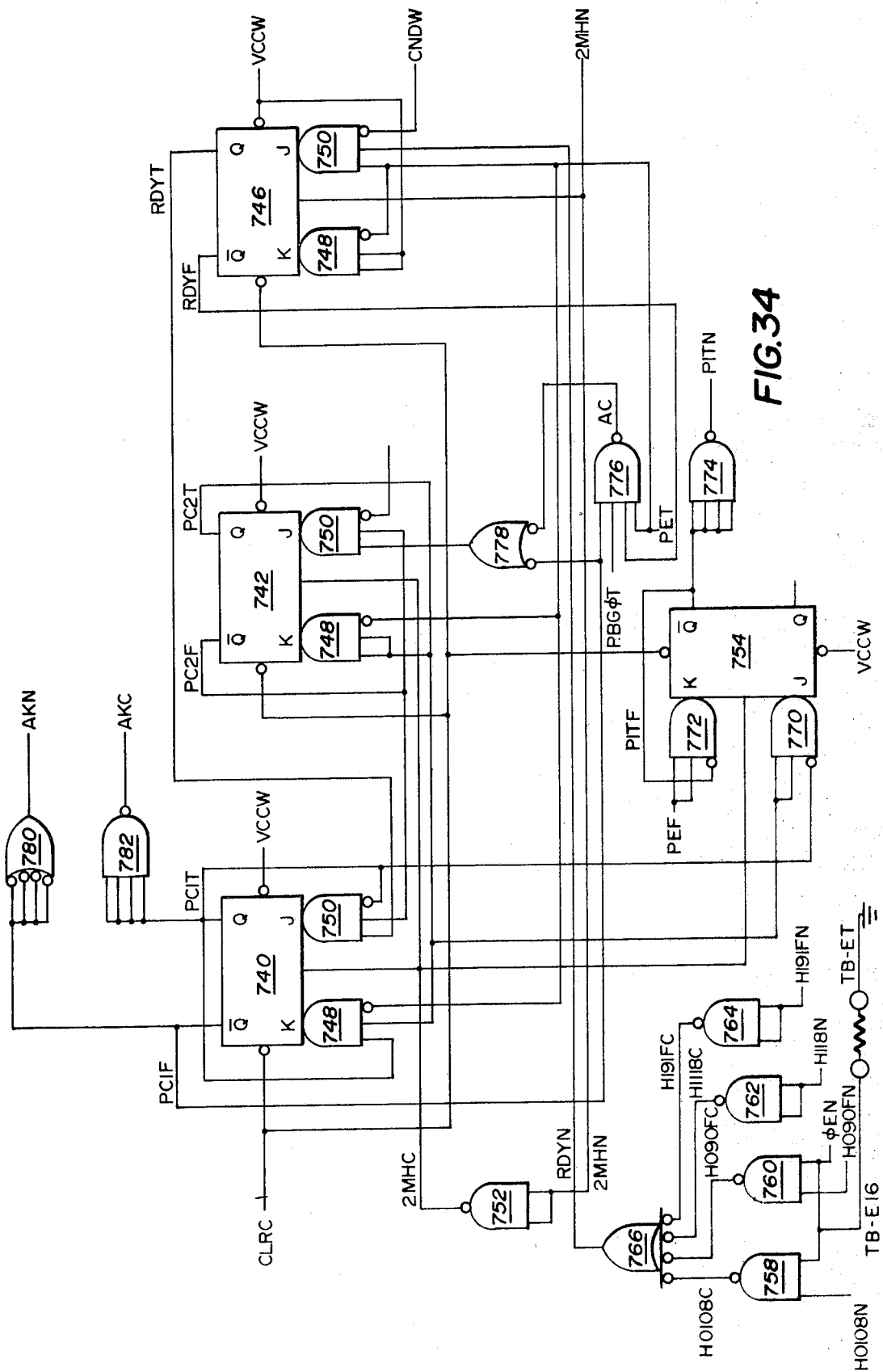
Figure 35:
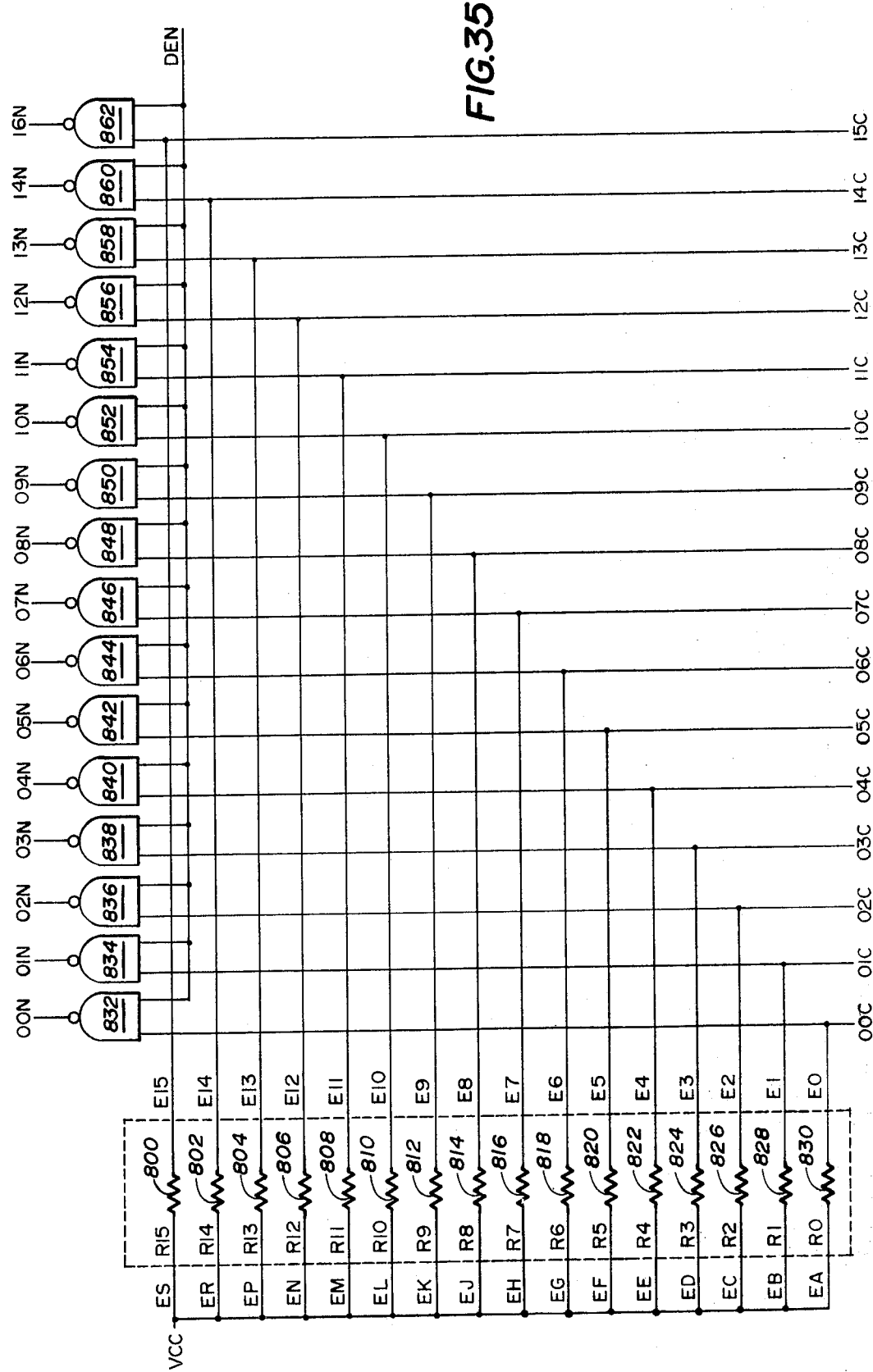
Figure 36:
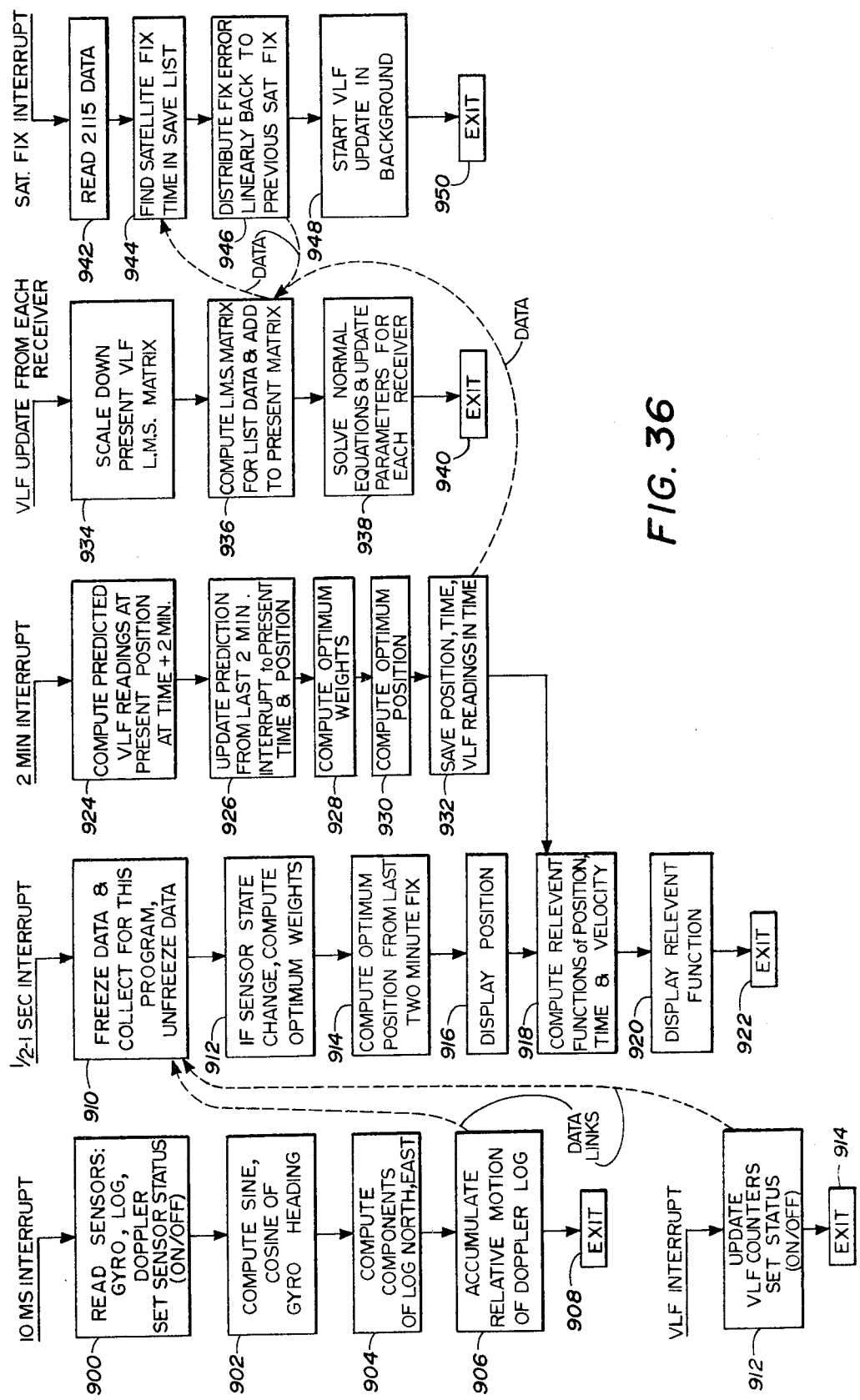

FIGS. 30—32 are logic diagrams of circuitry within the logic drawer 56 for interfacing between the VLF receivers and the computer 78 as shown in FIG. 10;

FIGS. 33–35 are logic diagrams of the circuitry of the processor bus controller within the logic drawer 56 shown in FIG. 10; and FIG. 36 is a flow diagram for accomplishment of the present invention within the computer 78 shown in FIG. 10.

THREE-SENSOR SYSTEM

Figure 1:
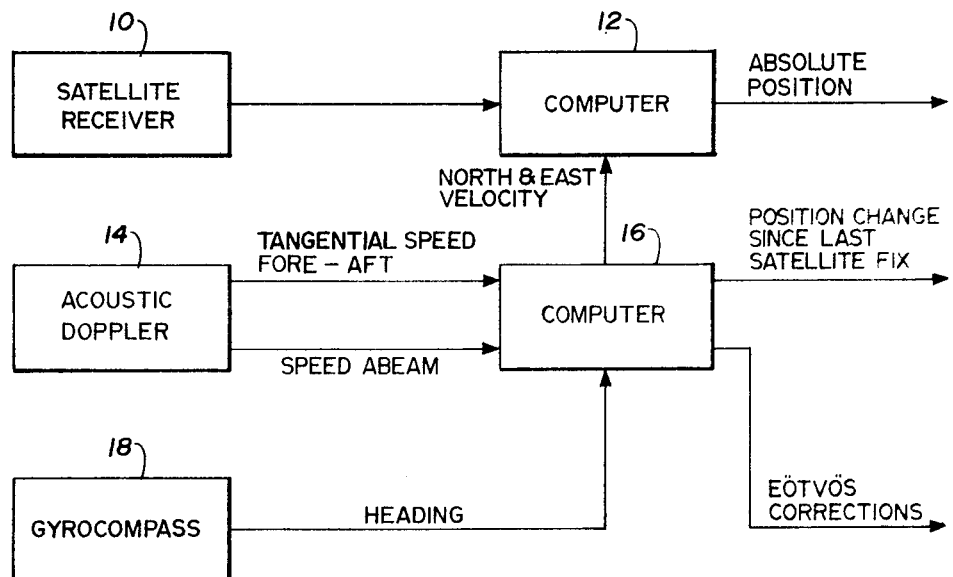
FIG. 1 is a block diagram of the three-sensor embodiment of the present invention.

Referring to the figures, FIG. 1 illustrates a block diagram of one embodiment of the invention utilizing multiple sensors. A satellite receiver 10 receives radio signals from an orbiting satellite to intermittently provide an absolute position fix which is fed to a digital computer 12. For the purposes of this disclosure, it will be assumed that the satellite receiver 10 provides an absolute position fix every two hours on the average. In actual practice, the mean-time between absolute position fixes will vary from about 2.65 hours at the equator to about 0.75 hours at 70° latitude. The accuracy of the absolute position fixes from the satellite receiver 10 will be assumed to be between 300 and 600 feet. The time for computing an absolute position fix will require from thirty seconds to three minutes, depending upon the speed of the computer 12.

An acoustic doppler system 14 is affixed to the vessel and transmits and receives acoustic signals to provide indications of the relative speed of the vessel in fore-aft and abeam directions. These speed indications are fed to a digital computer 16, which then generates indications of the north and east velocity of the vessel and also generates an indication of the position change of the vessel since the last satellite position fix.

A gyrocompass unit 18 is also carried by the vessel to provide continuous indications of the heading of the vessel. These indications are also fed to the computer 16, and are utilized to provide the position change indication from the computer. Also, the outputs from the acoustic doppler 14 and the gyrocompass 18 are utilized to provide EOTVOS corrections, as will be later described in greater detail.

Figure 2:
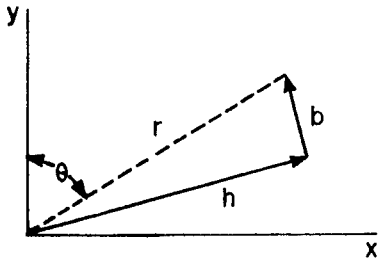
FIG. 2 is a diagrammatic illustration of the geometry of a portion of the system of FIG. 1.

The outputs of the satellite receiver 10, acoustic doppler 14 and gyrocompass 18 are combined by the computers 12 and 16 in an optimum manner in order to provide an extremely accurate absolute position indication which is much more accurate than the individual outputs of any of the sensors. In order to illustrate the theoretical operation of such a multisensor system, it will be assumed that the vessel containing the navigation systems shown in FIG. 1 moves at a compass heading of $\theta°$ with an error of $\theta_e$. It will be assumed further that the acoustic doppler indicates an ahead distance $h$ and an abeam distance $b$, both with an error of $E_d$ percent. This geometry is illustrated in FIG. 2.

The errors in the $x$ and $y$ directions are given by $$e_x = h[(1+E_d)\sin(\theta+\theta_e) - \sin\theta] - b[(1+E_d)\cos(\theta+\theta_e) - \cos\theta] \quad (1)$$

$$e_y = h[(1+E_d)\cos(\theta+\theta_e) - \sin\theta] + b[(1+E_d)\sin(\theta+\theta_e) - \sin\theta] \quad (2)$$

which may be combined into a radius of error approximately given by $$e_r^2 = (e_x^2 + e_y^2) = (h^2+b^2)[2(1+E_d)(1-\cos\theta_e) + E_d^2] \quad (3)$$

Now $\sqrt{h^2+b^2}$ is simply the distance which the vessel actually has traveled ($r$). Since $\cos\theta_e \approx 1 - \theta_e^2/2$, the previous equation may be rewritten as $e_r/r = \sqrt{\theta_e^2 + E_d^2}$ (4) where $\theta_e$ is expressed in radians and $E_d$ is a fraction.

The foregoing analysis applies to a vessel moving a straight line in an arbitrary direction. If the vessel moves on a curved path, the incremental error is given by $$\Delta e_r = \Delta r \sqrt{\theta_e^2 + E_d^2} \quad (5)$$

When the total path is divided into L segments, the total radius of error is given by $$\sum_{i=1}^{L} \Delta e_r = \sum_{i=1}^{L} \Delta r_i \sqrt{\theta_e^2 + E_d^2} \quad (6)$$

As $L \to \infty$, equation (6) becomes $$E = D \sqrt{\theta_e^2 + E_d^2} \quad (7)$$

where $D$ is the total distance which the vessel travels.

Figure 3:
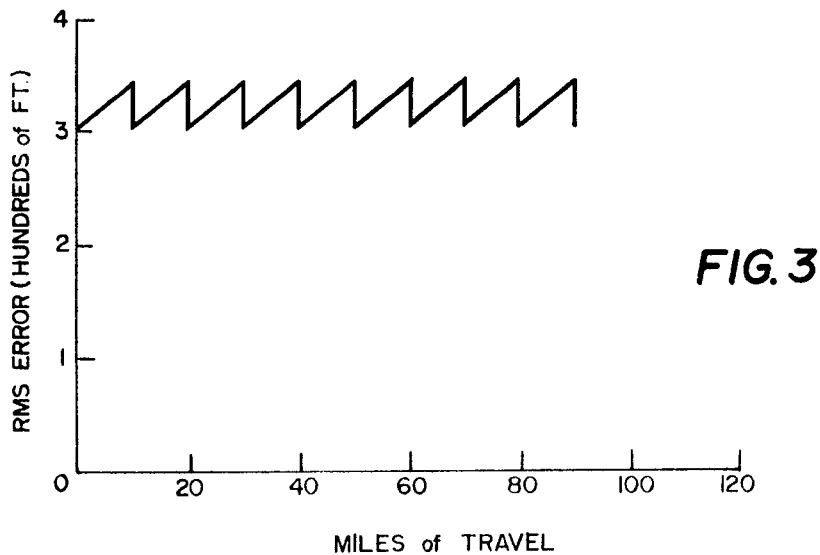
FIG. 3 is a graph of the RMS error of the present system without optimal data combination.

Representative values for $\theta_e$ and $E_d$ are about 0.1° and 0.2 percent, respectively, which corresponds to a total error in the acoustic doppler/gyrocompass combination is 0.265 percent of the distance which the vessel travels. Assuming a vessel speed of 5 knots and 2 hr. between satellite fixes, the error would be 160 feet giving an RMS error as illustrated in FIG. 3.

Figure 4:
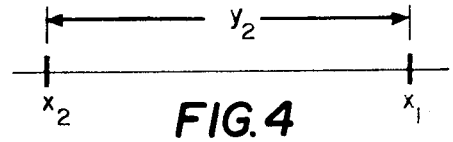
FIG. 4 is a diagram illustrating the geometry of movement of the system.

To apply optimal data combination to the multisensor system of FIG. 1, assume that the vessel is at $x_1$, as shown in FIG. 4, according to an absolute-position fix from the satellite receiver 10. The statistics of position determination are known so that a "circle of error" for $x_1$ can be determined. Assume further that the position $x_2$ and the distance $y_2$ between $x_2$ and $x_1$ have been determined by the satellite and acoustic doppler/gyrocompass systems, respectively. The $y_2$ statistics also are known and the circle of error is assumed, for the purposes of this example, to be E percent of $y_2$.

Note that $x_2 + y_2$ is essentially a measurement of $x_1$. Therefore, $$\hat{x} = \alpha_1 x_1 + \alpha_2(x_2+y_2) \quad (8)$$ where $\alpha_1$ and $\alpha_2$ are optimum weighting factors. Since it may be assumed that the two measurements of the position $x_1$ have different variances but identical means ($\bar{x}$), the constants $\alpha_1$ and $\alpha_2$ can be chosen so that $$E[\bar{x}-\hat{x}] = 0 \quad (9)$$

This implies that $$\bar{x} = \hat{x} \quad (10)$$

and $$\alpha_1 + \alpha_2 = 1 \quad (11)$$

To choose $\alpha_1$ and $\alpha_2$ optimally, the expectation of the mean-square error (variance) may be minimized; i.e., $$E[(\hat{x}-\bar{x})^2]|_{min} = \text{Var}[\alpha_1 x_1 + \alpha_2(x_2+y_2)]$$
$$= \alpha_1^2 \text{Var } x_1 + \alpha_2^2 [\text{Var } x_2 + \text{Var } y_2] \quad 12$$

Since the fixes $x_1$ and $x_2$ were determined similarly, they have the same variance ($S^2$). The variance of $y_2$ is $$\text{Var } y_2 = (EVT)^2 \quad (13)$$

wherein $E$ is the percent error in distance of $y_2$, $V$ is the average velocity while traveling from $x_2$ to $x_1$, and $T$ is the travel time.

Since $\alpha_2 = 1 - \alpha_1$, $$E[(\hat{x}-\bar{x})^2] = \alpha_1^2 S^2 + (1-\alpha_1)^2 [S^2 + (EVT)^2] \quad (14)$$

which may be differentiated to yield $$\frac{\partial E[(\hat{x}-\bar{x})^2]}{\partial \alpha_1} = 2\alpha_1 S^2 + 2(\alpha_1 - 1)[S^2 + (EVT)^2] \quad (15)$$

Setting this equal to 0 and solving for $\alpha_1$ yields $$\alpha_1 = \frac{S^2 + (EVT)^2}{2S^2 + (EVT)^2} = \frac{1+P}{2+P} \quad (16)$$

and $$\alpha_2 = 1/(2+P) \quad (17)$$

where $$P = (EVT/S)^2 \quad (18)$$

$P$ may be considered a system performance factor, for its value depends on the relationship between satellite and acoustic doppler gyrocompass accuracy ($E/S$), the average speed of the vessel ($V$), and the time between satellite fixes ($T$).

Once the optimum weighting factors $\alpha_1$ and $\alpha_2$ are determined, the actual variance associated with the point $x_1$ may be determined to be $$E[(\hat{x}-\bar{x})^2]|_{min} = \frac{S^2}{2} \frac{1+1.5P+0.5P^2}{1+P+0.25P^2} \quad (19)$$

This equation demonstrates the expected result $$\frac{E[(\hat{x}-\bar{x})^2]}{S^2}\bigg|_{min} < 1 \quad (20)$$

Figure 5:
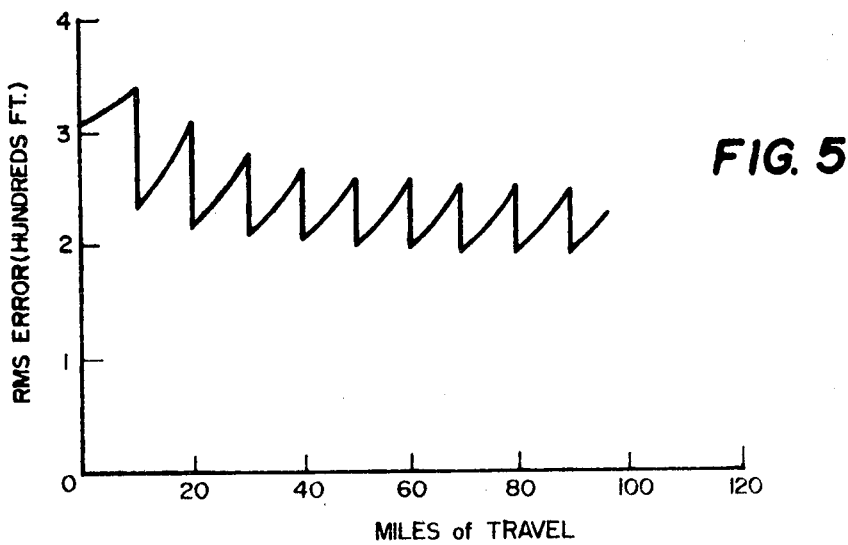
FIG. 5 is a diagram of the RMS error with optimal combination according to the invention.

A comparison of FIG. 3 with FIG. 5 will illustrate the reduction in RMS error provided by the optimal data combination according to the invention. Assuming that the vessel of the present example is equipped with an acoustic doppler system 14 with 0.2-percent accuracy and a gyrocompass 18 with 0.1° average error, an $E$ of $2.65 \times 10^{-3}$ is yielded. If the satellite system 10 has an RMS error of 0.05 nmi/fix, the E/S (or sensor factor) becomes 0.0925. If the vessel speed is 5 knots and the time between satellite fixes is 2 hours, the value of $P$ for this configuration is 0.85. As shown in FIG. 5, this represents an 0.45 improvement in variance, or a reduction in the size of the circle of error probability (cep) from 305 to 205 feet. This is a real-time improvement. This real-time optimal data processing results in an improvement of 100 feet in the RMS error of each satellite fix and reduces the maximum error accordingly.

Figure 6:
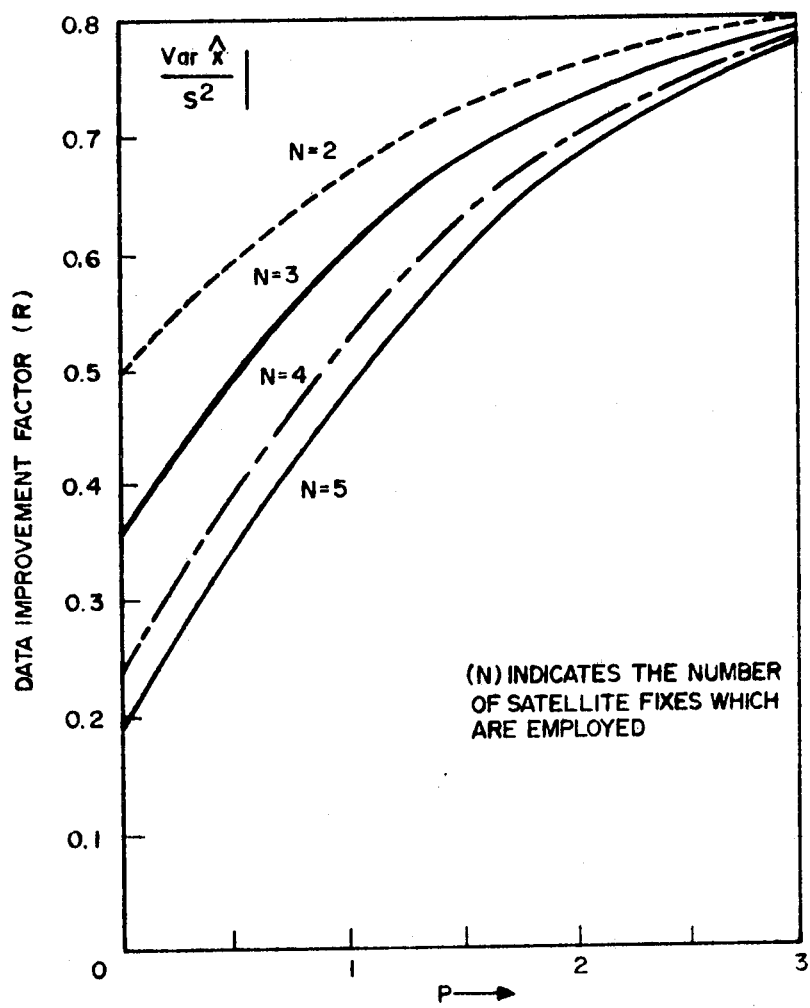
FIG. 6 is a graph of the data improvement factor of the invention as P is increased.

Optimal data combination according to the invention always improves a position fix. The amount of improvement is a function of $P$ only, which is illustrated in FIG. 6 for values of $P$ up to 3.5 and for numbers of satellite fixes up to $N=5$. Equations are stored in computers 12 and 16 for determination of the optimum weighting coefficients for any number of satellite fixes under any operating condition.

Figure 7:
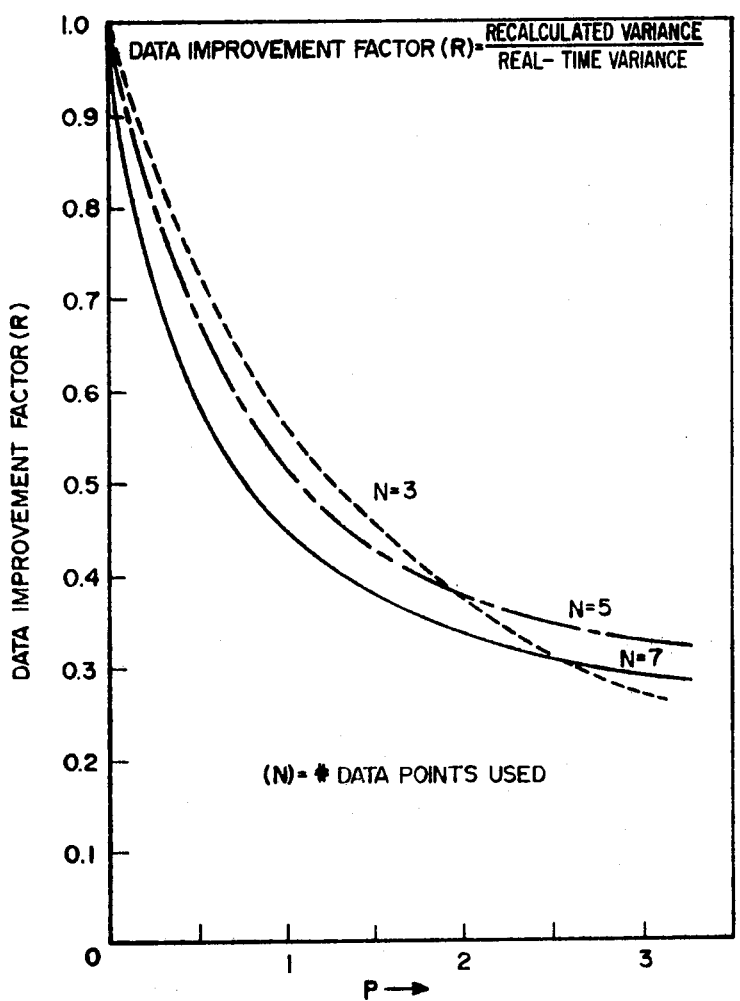
FIG. 7 is a graph of the data improvement factor with the utilization of recalculation of fixes.
Figure 8:
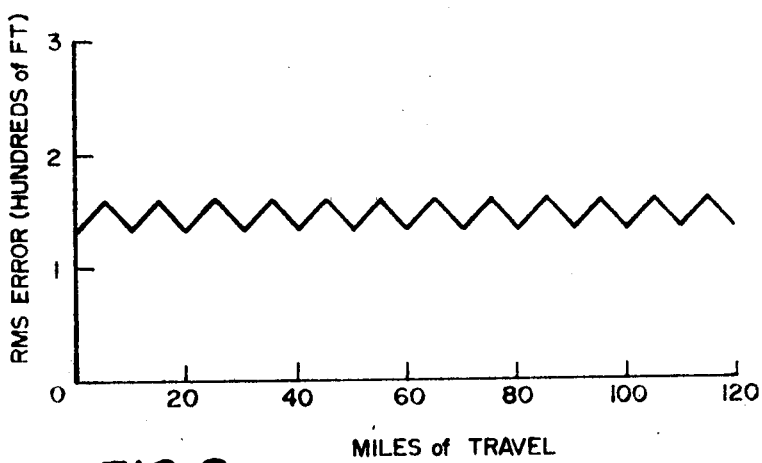
FIG. 8 is a graph illustrating the RMS error provided by recalculated fixes according to the invention.

Recalculation of a fix as more data become available is extremely valuable, for the accuracy of the real-time position can be improved up to 80 percent, depending on the value of $P$. This improvement is over and above that obtained by real-time optimal data processing. Curves of this data improvement for $N=3$, 5, and 7 satellite fixes are displayed in FIG. 7. Recalculation of position will thus improve the RMS error of the present example. According to FIG. 6, if seven satellite-position fixes are used in the present example, the variance is improved by a factor of 0.42, resulting in a recalculated RMS error of 133 feet at each satellite. In addition, relative-position data which are accumulated between fixes can be recalculated similarly, resulting in improved error limits as shown in FIG. 8.

Optimal data processing according to the invention has thus reduced the maximum error in the present example from 305 to 133 feet. In the more complex system to be later described, with more sensors and data inputs, the improvement will be even more dramatic.

FIVE-SENSOR SYSTEM

Figure 9:
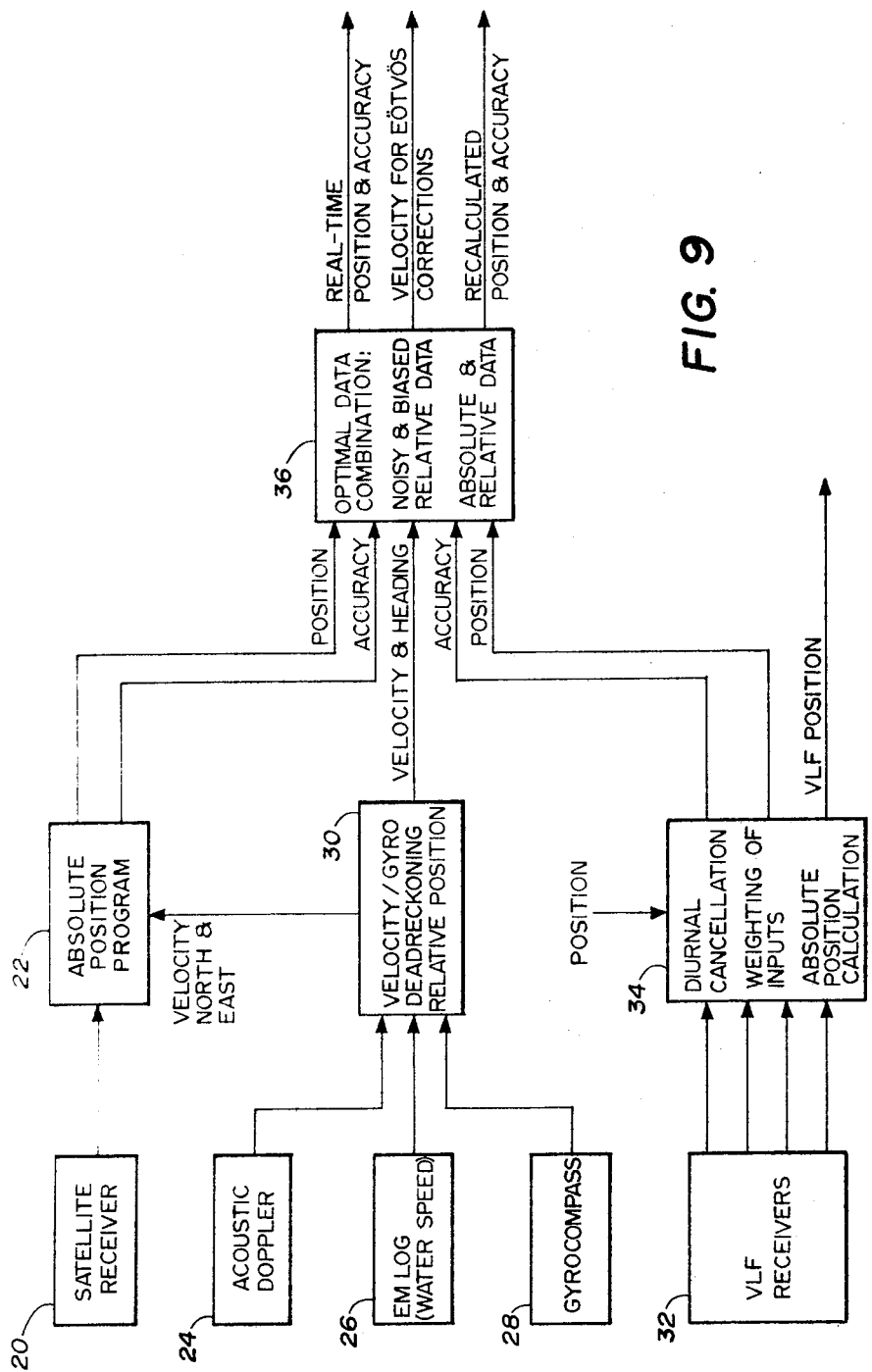
FIG. 9 is a functional diagram of the operation of a five-sensor system according to the invention.

The system shown in FIG. 1 may thus be seen to provide generally satisfactory navigation results for some limited purposes. However, this system is limited to depths in the range of 600 feet due to the lack of range of the acoustic doppler system. Additionally, it is desirable to provide improvement in the factor $E$ in the above-noted formulas. FIG. 9 illustrates a functional diagram of the preferred embodiment of the invention which utilizes five different sensor inputs.

A satellite receiver 20 intermittently receives radio signals from an orbiting satellite to provide absolute indications of the location of a vessel in terms of latitude and longitude. The output of the satellite receiver 20 is acted upon by an absolute position program 22. An acoustic doppler system 24 generates indications of the speed fore and aft and the speed abeam. An EM log, or alternatively a Pitot tube velocimeter 26, generates an output indicative of the speed of the water adjacent to the vessel. A gyrocompass system 28 generates indications of the heading of the vessel. Each of the outputs of the acoustic doppler, EM log and gyrocompass, are operated upon at 30 to provide indications of the velocity of the vessel which are utilized by the absolute position program 22.

A plurality of VLF receivers 32 receive radio waves transmitted from known remote transmitters to generate indications of the position of the vessel in the well-known manner. The outputs of the receivers 32 are operated upon at 34 for cancellation of diurnal noise, and for weighting of the outputs of the receiver. Calculations are made upon the outputs to provide an indication of a vessel position as determined by the VLF system.

Indications of the position and the accuracy of the satellite receiver 20 are combined with velocity and heading indications provided by the acoustic doppler 24, the EM log 26 and the gyrocompass 28. Additionally, indications of the position and the accuracy of the determination of the VLF receiver 32 is combined with the data from the other sensors to provide a real-time calculation of the position and accuracy of the system. By correlation and other comparison techniques, noise and bias data is substantially eliminated at 36. Signals are generated for EÖTVÖS corrections, and position and accuracy signals are provided to enable recalculation of data. As is known, the EÖTVÖS effect is caused by the change in centrifugal force as the earth's surface due to the ship's velocity adding to or subtracting from the surface rotational velocity. The EÖTVÖS effect is thus proportional to the east component of the ship's speed and to the cosine of the latitude.

FIG. 10 is a block circuit diagram of the preferred embodiment of the multisensor invention. A gyrocompass 50 generates heading signals which are fed to a synchrodigital converter 52 and to an acoustic doppler 54. The output from the converter and from the acoustic doppler 54 are fed into a P-channel input interface logic drawer 56. A rod meter 58 and EM log 60 generate water speed indication signals which are also fed into the logic drawer 56. A system control panel 62 enables operations to be selectively performed by the system operator. Two or more VLF receivers 64 are provided to receive Omega or VLF radio signals transmitted from remote fixed stations. Omega or VLF radio navigation gating unit 66 gates the operations of the receiver 64. The receiver 64 generates indications of the location of the vessel which are fed into an input of the logic drawer 56. A frequency standard 68 provides a frequency for comparison with the received VLF radio waves to enable a position determination to be made.

A satellite receiver system 70 receives radio signals from an orbiting satellite and generates signals which are fed into a digital computer 72. A teletype 74 is connected to the computer 72. The output of the computer 72 provides indications of the absolute location of the vessel and is fed into a direct memory access (DMA) channel interface logic drawer 76. Logic drawer 76 also transmits data to and from the digital computers 72 and 78. Signals from the logic drawer 56 are fed to computer 78, which performs the optimum combination previously described and also minimizes the effects of noise on the system. The output of the computer 78 is provided to a tape punch peripheral unit 80.

Tape reader 82 and a teletype 84 complete the peripheral equipment for the computer 78. A position plotter 85 plots the navigational information provided from the computer 78 through the logic drawer 76. A deviation plotter 86 is provided in the navigation house of the vessel to provide an indication of the deviation of the vessel, while a deviation plotter 88 is located upon the bridge of the vessel for a similar purpose.

A processor bus (P-channel) output interface logic drawer 90 receives indications from the logic drawer 56 to drive a bridge latitude longitudinal display 92 and a navigational house latitude-longitude display 94. Additionally, the output of the logic drawer 90 drives an instrument room situation display 96.

Each of the five sensors utilized in the preferred embodiment of the invention shown in FIG. 10 comprise conventional commercially available units.

THE GYROCOMPASS

The gyrocompass 50 may for instance comprise the gyrocompass system manufactured and sold under the designation MK-14 by the Marine Systems Division of the Sperry-Rand Corporation in Charlottesville, Virginia. This gyrocompass system combines the fundamental principles of the gyroscope with the natural phenomena of the earth's rotation and the force of gravity. The resulting instrument aligns itself with the geographic meridian and provides a constant true-north indication regardless of the rolling, pitching and yawing of the vessel.

Since the gyrocompass 50 is referenced to the earth's rotation instead of the earth's magnetic field, the vessel's movement is important. If the direction of travel is east or west, the vessel's motion only adds to or subtracts from the earth's motion, and the effect on the indication of the compass is negligible. However, when the vessel is traveling north or south, the ship's speed produces a result which is not parallel to the plane of the earth's rotation. Thus, the effect on compass indications is proportional to the ship's speed and course. For all northern or southern courses, a latitude correction must be introduced into the gyrocompass. That is, the higher the latitude, the smaller the movement of the earth and the larger the correction required. Therefore, the amount of the correction is dependent upon the latitude of the ship. This correction varies inversely as the cosine of the latitude and can be expressed as:

$$\Delta = \sin^{-1}\left[\frac{v \cos (\text{apparent heading})}{900 \cos (\text{latitude})}\right] \quad (21)$$

where
$v$ = velocity of the ship.

Typical gyrocompasses such as the Mark-14 manufactured by the Sperry Corporation exhibit short term dynamic errors of less than ±0.6° regardless of the roll, pitch, and yaw of the ship. Although the Mark-14 may have an average error of 1°, this error is not of great concern, for it may be treated as a "variable installation error" which can be measured by comparing the actual heading with an accurate reference.

The synchrodigital converter 52 may comprise the converter A602-13T manufactured and sold by Astro Systems, Inc. of New Hyde Park, New York.

ACOUSTIC DOPPLER 54

The acoustic doppler 54 may comprise the doppler system manufactured and sold as MRQ2015 by the Marine Electronics Products Division of the Marquardt Corporation of Van Nuys, California. The operation of such doppler systems is described in detail in literature and in a number of issued patents.

Basically, the doppler technique of velocity measurement is based upon the principle that a signal transmitted from a moving object and reflected from a stationary surface will indicate an apparent shift in frequency. If the signal is aimed in the direction of motion of the moving object, the reflected signal will register an increase in frequency. Conversely, if the signal is aimed opposite to the direction of the object's motion, the reflected signal will register a decrease in frequency. This frequency shift is directly proportional to the speed of the moving object in relation to the reflecting surface. Such doppler systems offer a means of computing distance travel and velocity with a high degree of accuracy.

Figure 11:
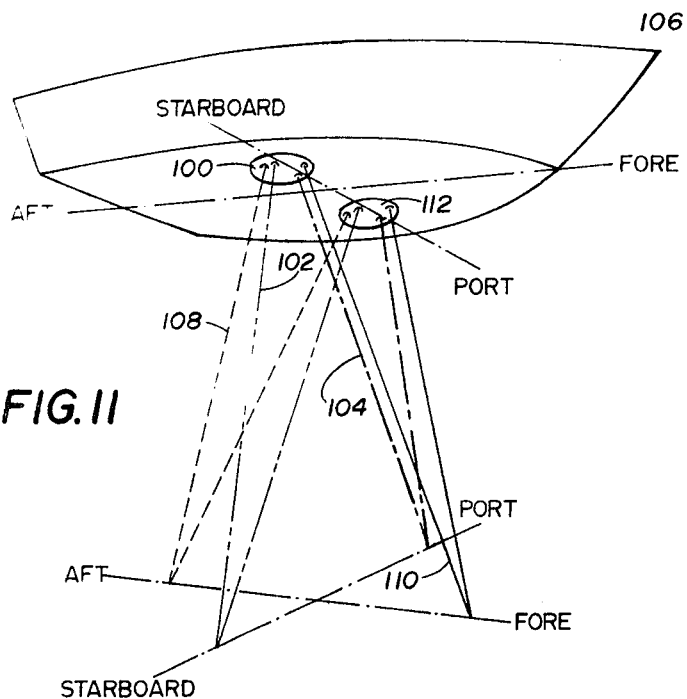
FIG. 11 is a diagrammatic illustration of the operation of the doppler radar of the invention.
Figure 12:
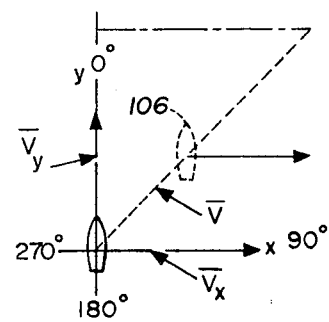
FIG. 12 is a diagram of the geometry of the doppler radar.

FIGS. 11 and 12 illustrate the basic operation of such a doppler system. The system comprises a first transducer 100 which directs first pairs of acoustic signals 102 and 104 obliquely to the ocean floor in the starboard and port directions of the vessel 106. Additionally, a signal 108 is directed to the aft of the vessel 16 and a signal 110 is directed fore of the vessel 106. A transducer 112 receives the reflected signals to provide measurements of the frequency changes of the acoustic signals. By averaging of the frequency differences between the fore and aft and the port and starboard directions, compensations for the motion of the vessel 106 may be accomplished and true velocities determined. Averaging of the directional components is illustrated in FIG. 12, wherein the determination of components of the ship's travel presents the true direction of travel of the vessel.

Doppler systems such as the above-identified Marquardt system have maximum operating depths at generally about 600 feet, with distance and speed accuracies in the order of about 0.5 percent. The velocity measurements obtained by this system are virtually independent of the roll and pitch motions of the vessel, to a first order.

EM LOG 60

The rod meter 58 and EM log 60 may comprise the EM log system manufactured and sold under the identifying part numbers UL100-3, UL200-72F, UL300 and UL400-3, by the Chesapeake Instrument Corporation of Shadyside, Maryland. This system provides accurate indications of the water speed. The log operates on the electromagnetic principle, wherein a linear voltage proportional to water speed is generated within an underwater sensor assembly. The electromagnetic principle by which the log operates is a form of Faraday's law, which is in the form:

$$e = Bl\bar{v}^{(10^{-8})} \text{ volts} \quad (22)$$

where
$B$ = flux density
$l$ = length
$\bar{v}$ = velocity

Figure 13:
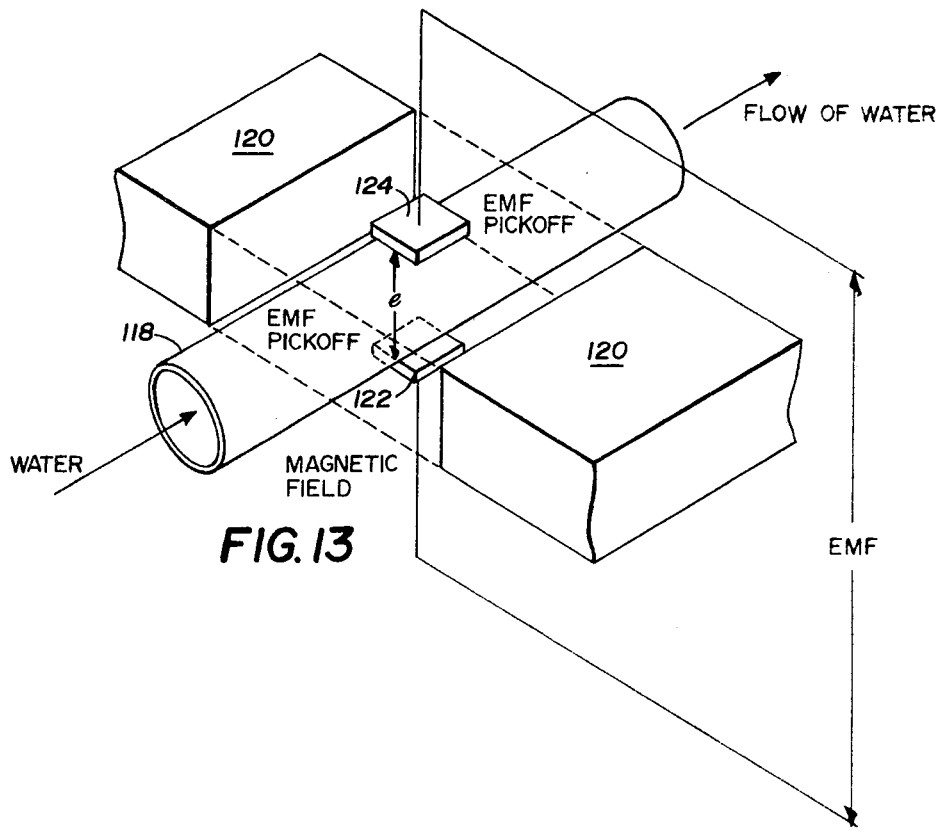
FIG. 13 is a diagrammatic illustration of the operation of the EM log of the invention.

This law states that when a conductor cuts a magnetic field, an emf is produced which is proportional to the rate at which the field is cut. In the EM log, this conductor is the water. FIG. 13 illustrates the basic flow meter around which the EM log was developed. Water enters a tube 118 and cuts through the magnetic field generated by a coil 120 which is encapsulated in the underwater sensor of the log. Coil 120 is energized by an AC signal. Two pickups 122 and 124 are contained within the underwater sensor, across which an emf is generated when the magnetic field is cut by the water passing by it. This emf is sensed by suitable detection circuitry to provide an indication of water speed.

The EM log 60 has a speed accuracy of about ±0.1 percent up to 10 knots and about ±1 percent of speed above 10 knots. Water currents, sets due to wind, and water turbulence along the hull of the ship cause errors in ground speed calculations.

THE VLF SYSTEM 64

The VLF navigation radio system utilized in the preferred embodiment of the invention is the Omega Navigational Receiver System manufactured and sold by Tracor Incorporated of Austin, Texas. Preferably, three VLF receivers of the type 599H manufactured and sold by Tracor Incorporated are utilized with a 533S Omega Gating Unit. A 304B frequency standard and a standby power supply 312C from Tracor Incorporated is also utilized.

The operation of the Omega Navigation System is well known, and will thus not be described in detail. Basically, the Omega Navigation System is based upon travel time difference measurement, and is an earth-referenced, hyperbolic navigation system, operating in the internationally allotted navigation band between 10 and 14 kHz. The present Omega Navigation System consists of four transmitting stations located in Trinidad, Hawaii, New York and Norway.

In the current Omega System, pulsed 10.2 kHz. and 13.6 kHz. continuous wave signals are transmitted sequentially from each transmitting station. Another signal at 11.33 kHz. will also be transmitted in future configurations of the system. All of the transmitting stations are synchronized, with each station emitting a 10.2 kHz. and a 13.6 kHz. pulse precisely timed in sequence. The pulse length, plus its position in the 10-second transmitting period, identifies the transmitter. In the present four station network, each station transmits during two of the eight available transmitting spaces.

The spatial variate measured with the Omega system is the phase of a VLF signal. The accuracy with which mean-time-difference readings at any given location can be predicted obviously depends on the accuracy with which the mean time of propagation between two points can be predicted. The phase velocity in the Omega system varies not only with changes in ionospheric height, but also with other parameters such as ground conductivity, solar angle, and geomagnetic path orientation.

The Omega system is corrupted somewhat by noise which is a function of distance. The change in velocity of the VLF signals in the Omega system between day and night are referred to as the diurnal shift, or diurnal variation. This shift is due primarily to the ionosphere and its effect on propagation time as it raises and lowers. This shift is relatively predictable, thus allowing for compensation in the computer 78 by a stored program.

The stored program solves the following equation to provide a prediction of the VLF signal at a given point:

$$\phi_{pred} = \phi_0 + \alpha(t - t_0) + \mu_0 \int_{\phi_{l\lambda i}}^{\phi_{s\lambda s}} F(t, \theta, \lambda)$$
$$+ (K_2 + FK'_2)(K_5 \cos \phi_m \sin \alpha_m + K'_5 \cos \phi_m \sin^2 \alpha_m)$$
$$+ (K_3 + FK'_3)(K_6 \cos 2\phi + K'_6 |\sin \phi|) ds \quad (23)$$

where,
$\phi_{pred}$ = predicted VLF phase $\phi_0$ = starting constant (unknown)
$\alpha$ = drift rate (unknown)
$t$ = time for prediction
$t_o$ = time origin
$\mu_o$ = nominal inverse wavelength
$(\phi_i,\lambda_i)$ = latitude, longitude of $i$th transmitter
$(\phi_o,\lambda_o)$ = latitude, longitude of receiver
$F$ = diurnal function, where $F = -1 \leq \cos x < -0.15$
$C_3 - C_4 \cos x$ $-0.15 < \cos x < -0.04$
$C_7(1 - \cos x) - 0.04 < \cos x \leq 1$ $x$ = solar zenith angle at point $(\phi,\lambda)$ at time $t$
$K_2, K'_2, K_5, K'_5, K_3, K_6, K'_6$ are unknown parameters
$\phi_m$ = magnetic latitude at $(\phi,\lambda)$
$\lambda_m$ = magnetic bearing of propagation path at $(\phi,\lambda)$.

This integral is evaluated along great circle (great elliptic arc) from transmitter to receiver. This formula was obtained from the Naval Electronics Laboratory Center, Technical Document 26, 29 March 1968, by E. R. Swanson.

Other VLF navigation systems may be alternatively utilized with the present invention. An example of such a system is the Lamba Navigation system which is a low ambiguity, position fixing system which incorporates lane identification and phase-locked oscillators at both ship and ground stations. This system is advantageous in that it does not require extra ground stations, but it does require an additional radio frequency which is used only for a fraction of a second during lane identification.

Other conventional navigation systems which may also be utilized are Hi Fix Decca, Shoran, Hiran, Lorac A and B, DM Raydist, Autotape DM 40, Toran and Loran C.

SATELLITE RECEIVER 70

The satellite receiver 70 preferably comprises the satellite receiver system MX702/CA manufactured and sold by the Magnavox Company of Fort Wayne, Indiana. This receiver utilizes the Navy Navigation Satellite System (NNSS) wherein a constant frequency radio transmission from an orbiting earth satellite is required by a ground station on the surface of the earth with an apparent variation of frequency. This frequency variation $\Delta f$ is an accurate measure of the rate of change of the slant range between the transmitter and the receiver.

$\Delta f$ is thus influenced by the motion of the satellite in inertial space, the motion of the receiving point as a point on the rotating earth, motion of the receiving station as it is traveling on or over the surface of the earth, and refraction effects on the radio travel path from the satellite to the vessel.

The doppler shift is stated quantitatively by $$\Delta f = (\dot{p}/c) f \quad (24)$$

wherein, $\Delta f$ = the doppler shift,
$\dot{p}$ = the rate of change of range between source and observer,
$c$ = the velocity of light, and
$f$ = the transmitted frequency.

Measuring the doppler shift, therefore, is the equivalent of measuring the range rate.

The amount of frequency shift is proportional to the velocity of approach or recession, and the exact amount depends on the location of the receiving station with respect to the satellite. By an accurate measure of the doppler shift in frequency and with precise knowledge of the satellite's orbit, it is possible to calculate the position of the station on earth.

Accuracies better than 0.1 mile can be obtained utilizing this doppler-shift technique with the receiver 70, because quantities measured (frequency and time) can be measured to an accuracy of one part in a billion, and because, of all possible satellite path, only one results in a particular curve of doppler shift.

Two basic problems are inherent in this apparently simple and straightforward navigation system, that of ionospheric refraction of radio waves and deviations in satellite orbits caused primarily by the earth's oblateness and gravity variations.

To overcome the problem of ionospheric refraction, the satellites transmit on two or more frequencies. By transmitting on a second frequency, controlled by the same oscillator to insure that the signals are coherent, it is thus possible to make a correction for refraction and reduce refraction error to a very low level.

The second problem, the impossibility of predicting the position of a satellite with an accuracy of less than a mile for more than 3 or 4 days in advance, makes it necessary to publish satellite ephemeris data in almanac form. The NNSS computing centers compute future orbital parameters and transmit the information to the satellites. The satellites, equipped with a magnetic memory, then transmit the three corrected coordinates of the satellite each 2 minutes for 12- to 14-hour periods.

The present NNSS consists of five groups of equipment including three satellites, a network of tracking or receiving stations, a computing center, an injection station, and navigational receiving equipment. All ground stations are linked by a high-speed data-transmission system. The timing reference for the entire system is obtained from receivers and standards located at the Naval Observatory.

Navy plans call for a system of four satellites in polar circular orbits at an altitude of 600 nautical miles. Each satellite weights about 100 pounds and contains two harmonically related transmitters used to transmit orbit parameters and timing signals, a digital memory, a clock to count the cycles of the stable oscillator, receiver for injection signals, and a phase modulator for modulation of doppler transmitters.

Additionally, telemetry equipment is employed to provide information concerning the operation of satellite instrumentation. The satellites transmit at about one watt, enough power to provide a 15 db. margin at ground stations using nondirectional antennas.

There are four ground tracking stations in the NNSS, each of which measures doppler frequency on both satellite transmissions and automatically corrects for ionospheric refraction. At least one of the tracking stations must monitor the time pulses from the satellite for comparison with standard time epochs as determined by the Naval Observatory. The doppler data, corrected for refractions and small errors in time signals are transmitted by teletype to the computing center.

At the computing center, the tracking-station data are used to determine the satellite orbit, after which the future satellite positions are precomputed for the necessary time span. In addition, time errors are analyzed and corrections to both the clock rate and clock setting determined. All of the computations required to update the orbit are accomplished in a few hours. A computer with the capability of the IBM 7090 is utilized to compute the orbits of the four satellites.

Corrected data for transmission to the satellite are sent from the computing station to the injection station by teletype. When the satellite is within range of the injection station, the satellite memory is erased, new information inserted into the memory, and the clock reset and regulated. Immediately thereafter, the satellite repeats all data to the injection station for comparison with the original transmission and for correction of any errors. When accurate storage in the satellite memory has been verified, the magnetic memory is locked out from additional receipt of information for approximately 12 hours, at which time the satellite is again within range of the injection station. Two injection stations are utilized in the system, the second station being required primarily for system reliability.

Figure 14:
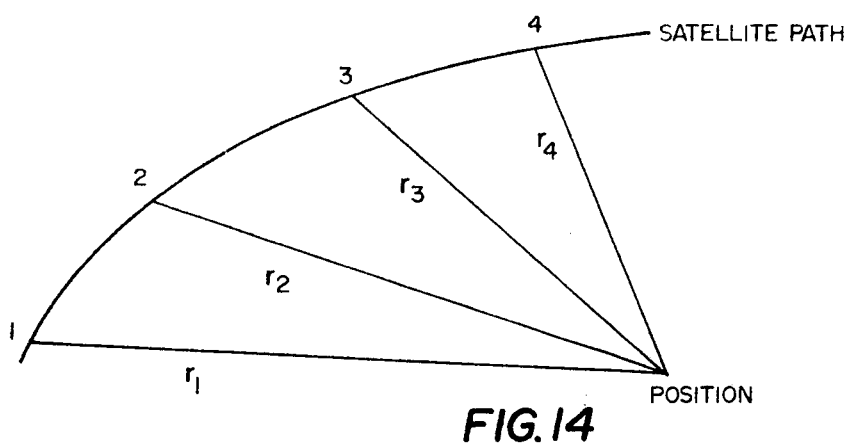
FIG. 14 is a diagrammatic illustration of the utilization of a number of satellite fixes according to the invention.

In the present NNSS, the integral of the doppler shift over several precisely measured two minute intervals is determined. Referring to FIG. 14, a satellite travels about 450 miles during a two minute interval from point 1 to point 2. The satellite transmits a digital code word every two minutes, and these signals can be used as a very accurate timing reference.

Figure 15:
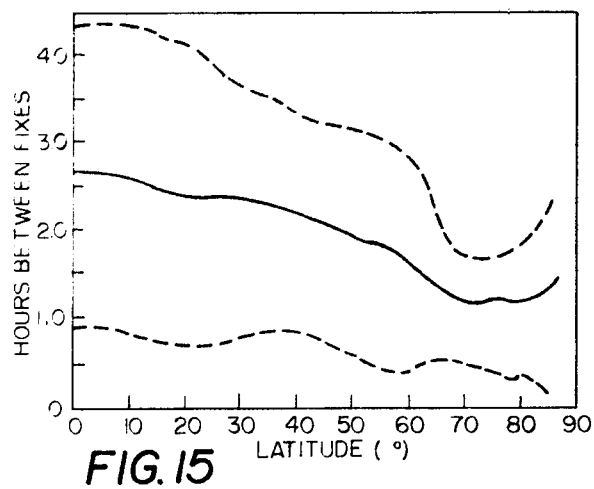
FIG. 15 is a graph of the average time between fixes for three satellites in a satellite navigation system.

During one pass of a satellite, it is possible to obtain as many as eight or nine 2-minute intervals (1-2, 2-3, 3-4, etc.), although not all passes will provide this many intervals. Only three intervals are required for a position determination. FIG. 15 shows the average time between fixes for three satellites, based upon data contained in "Transit Navigation Satellite System for Offshore Operation" by Thomas A. Stansell, OECON 1968, New Orleans, Feb. 14–16, 1968.

The navigational error produced in the satellite navigation system by ionspheric refraction can be visualized by noting that the maximum slope of the doppler curve is a rough measure of slant range, and that refraction has a direct effect on the slope. Refraction decreases the slope, thus placing the navigator-computed position farther from the subsatellite point than would be true if the ionosphere were absent. By simultaneously measuring the doppler shift at two different frequencies, however, refraction error in the present system can be reduced significantly below 0.5 nautical miles.

Figure 16:
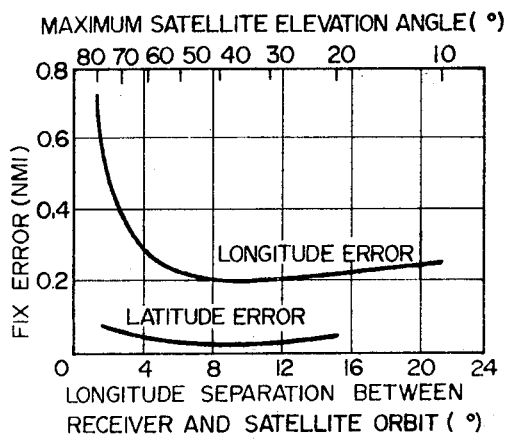
FIG. 16 illustrates the north fix latitude and longitude errors resulting from each knot of speed in a satellite navigation system.
Figure 17:
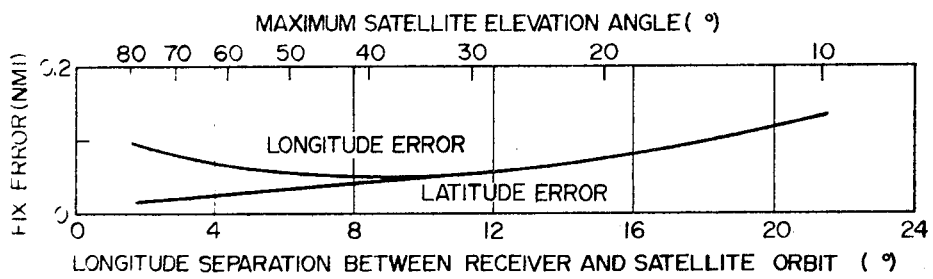
FIG. 17 illustrates the east fix error resulting from each knot of speed in a satellite navigation system.

Some errors are introduced into the NNSS output by velocity errors. However, these velocity errors produce changes in the doppler curve that are partially orthogonal to the navigator-computer position. Thus, the full effect of these velocity errors is not reflected in the navigation error. FIG. 16 illustrates the North fix latitude and longitude errors resulting from each knot of speed, while FIG. 17 illustrates the East fix error resulting from each knot of speed.

Other types of satellite navigation systems other than the NNSS may be utilized as they become available, such as the Interferometric Satellite System proposed by the Westinghouse Corporation. Alternatively, the Autoscan Ranging Satellite Computer System proposed by the General Electric Corporation may be utilized when the system is fully implemented.

DIGITAL COMPUTERS 72 and 78

While computers 72 and 78 may comprise any two suitable conventional digital computers, or alternatively a single large capacity computer, in the preferred embodiment computer 72 comprises the HP2115 Digital Computer manufactured and sold by the Hewlett Packard Corporation. Software for the HP2115 Computer for the satellite fix computation comprises the MAPS–35568 or similar software package sold by the Magnavox Corporation. Computer 78 preferably comprises the TI2540 Digital Computer manufactured and sold by Texas Instruments Incorporated of Dallas, Texas.

LOGIC DRAWER 76

FIGS. 18–21 illustrate the direct memory access (DMA) channel interface logic drawer 76 which provides interfacing between computer 72 and computer 78. The logic circuitry illustrated in FIGS. 18–21 are symboled according to Military Standard–806, published by the Defense Department and the U.S. Air Force.

Figure 18:
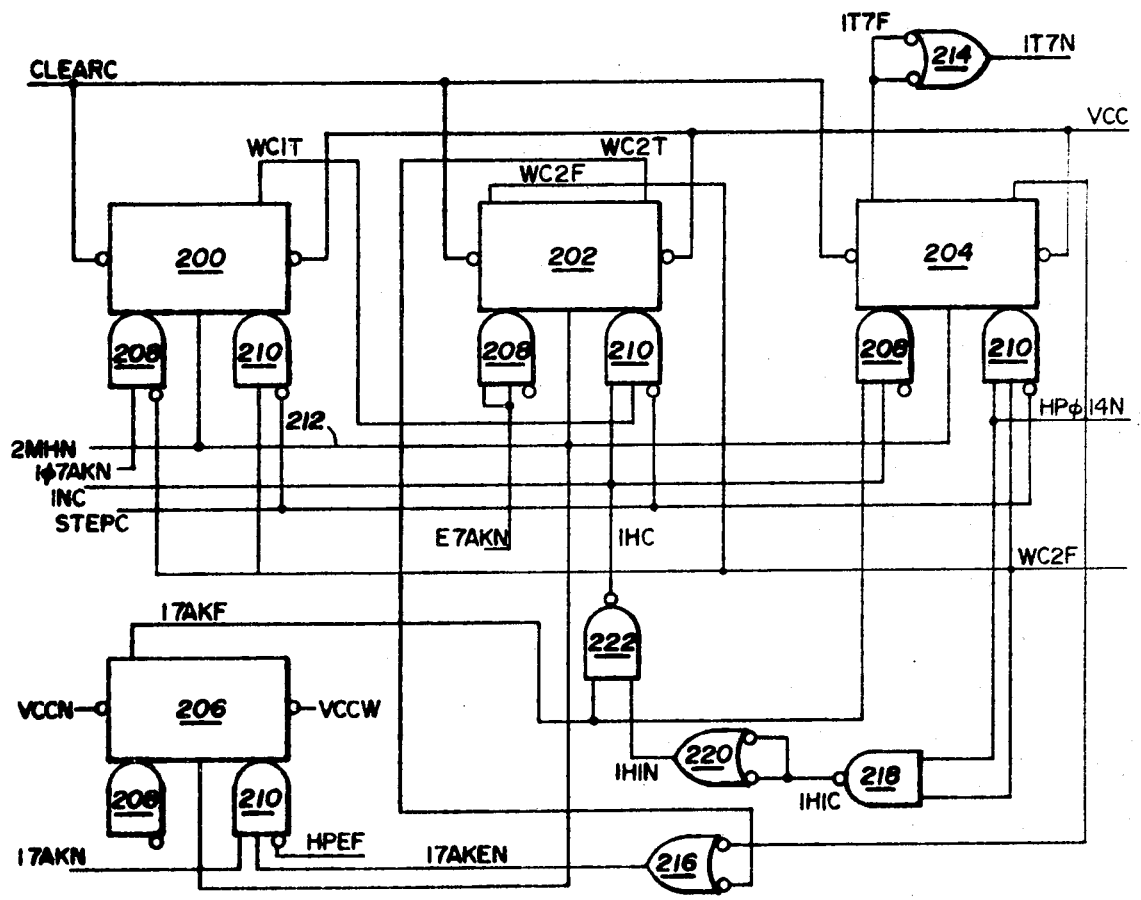
FIGS. 18 and 19 are logic diagrams of the direct memory access channel interface logic shown in FIG. 10.

The logic circuitry shown in FIG. 18 comprises a word counter, an interrupt circuit and a synchronizing circuit which enables data flow to and from each of the computers. The circuits also generate control signals to meet the requirements of the channels in each computer. The circuit comprises four flip-flop circuits 200, 202, 204 and 206. Each flip-flop circuit has associated with its K-J terminals, respectively, a pair of AND-gates 208 and 210. A clock input of two megacycles is fed via lead 212 to the inputs of each of the flip-flops 200–206.

The Q output of flip-flop 204 is connected to an OR-gate 214 to provide the output IT7N. The Q output of the flip-flop 204 is connected to the OR-gate 216, with the WC2T output of flip-flop 202 also being provided to the input of the OR-gate 216. The output of gate 216 is fed to an input of the gate 210 connected to the flip-flop 206. Signals HPO14N and WC2F are fed both to gate 210 and to the NAND-gate 218. The output of gate 218 is connected to an OR-gate 220, which in turn is connected to the input of a NAND-gate 222. A plurality of command signals and computer input and output signals are illustrated as being fed into and from various portions of circuitry, and will thus not be described in detail.

In operation of the circuit shown in FIG. 18, the flip-flops 200 and 202 act as a word counter to indicate when a two-word data transfer has been completed. Two list words are required in the circuitry to initiate a transfer in either direction from the computers. The output states of the two flip-flops 200 and 202 operate according to a logic sequence to provide an indication of the word completion.

Flip-flop 204 operates to generate an interrupt signal to the TI–2540 computer when desired. Flip-flop 206 operates as a synchronizing circuit for synchronizing the input channel acknowledge signals from the TI–2540 computer.

Figure 19:
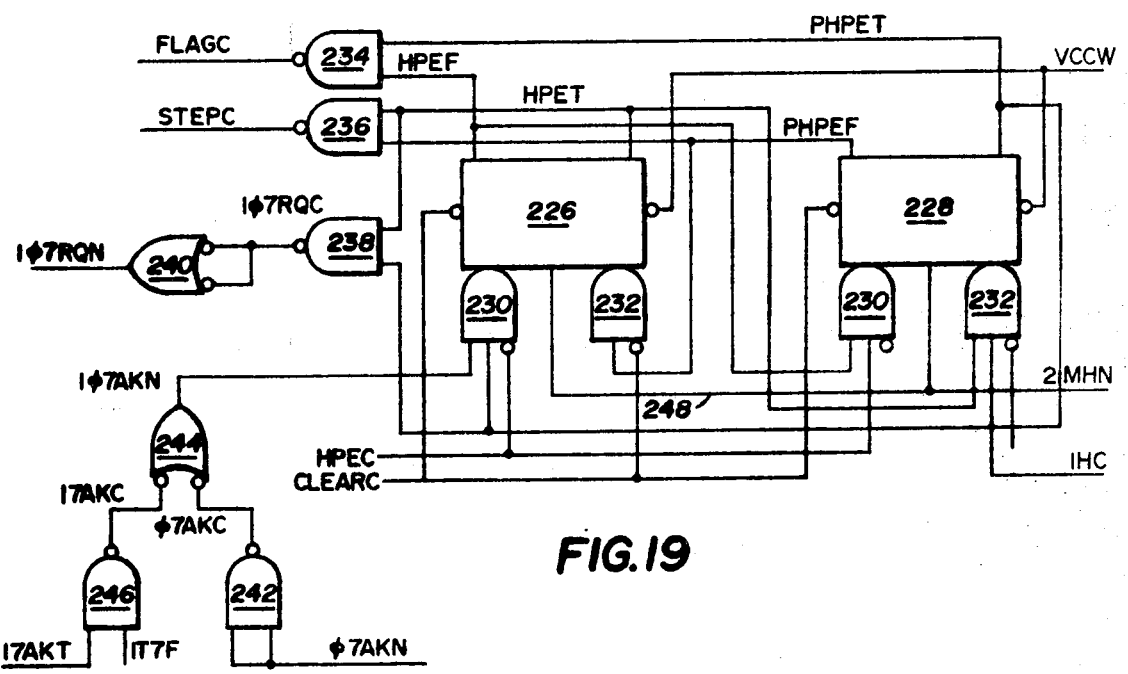

FIG. 19 illustrates the transfer control circuitry for data passing between the computers. The circuit comprises flip-flop circuits 226 and 228, along with associated NAND-gates 230 and 232. The False output of the flip-flop 226 and the True output of the flip-flop 228 are fed to a NAND-gate 234, while the opposite outputs of the two flip-flops are fed through a NAND-gate 236. The True outputs from the flip-flops 226 and 228 are fed to a NAND-gate 238, whose output is fed to an OR-gate 240. The signal 07AKN is fed to the inputs of a NAND-gate 242 which feeds a signal to the input of an OR-gate 244. Another signal 17AKC is fed to the input of the gate 244 from the output of a NAND-gate 246. A 2-megacycle clock signal is fed to control the flip-flops 226 and 228 via lead 248. Various other input and output signals to and from portions of the circuitry shown in FIG. 19 are indicated on the drawing.

Once the proper word requests have been made to the transfer control circuitry of FIG. 19, the states of the flip-flops 226 and 228 sequentially change to provide transfer control between the computers. For instance, the word HPEC denotes that the outputs of the two flip-flops are both at logic zero. When the outputs of the flip-flops 226 and 228 are logic 10, the word count has been defined and the next state of the flip-flops 226 and 228 is logic 11 to define a request. The TI–2540 computer acknowledges signals occurring prior to the changing of the states of the flip-flops 226 and 228 to logic 01, wherein a flag function occurs and the flip-flops 226 and 228 recycle.

Figures 20, 21:
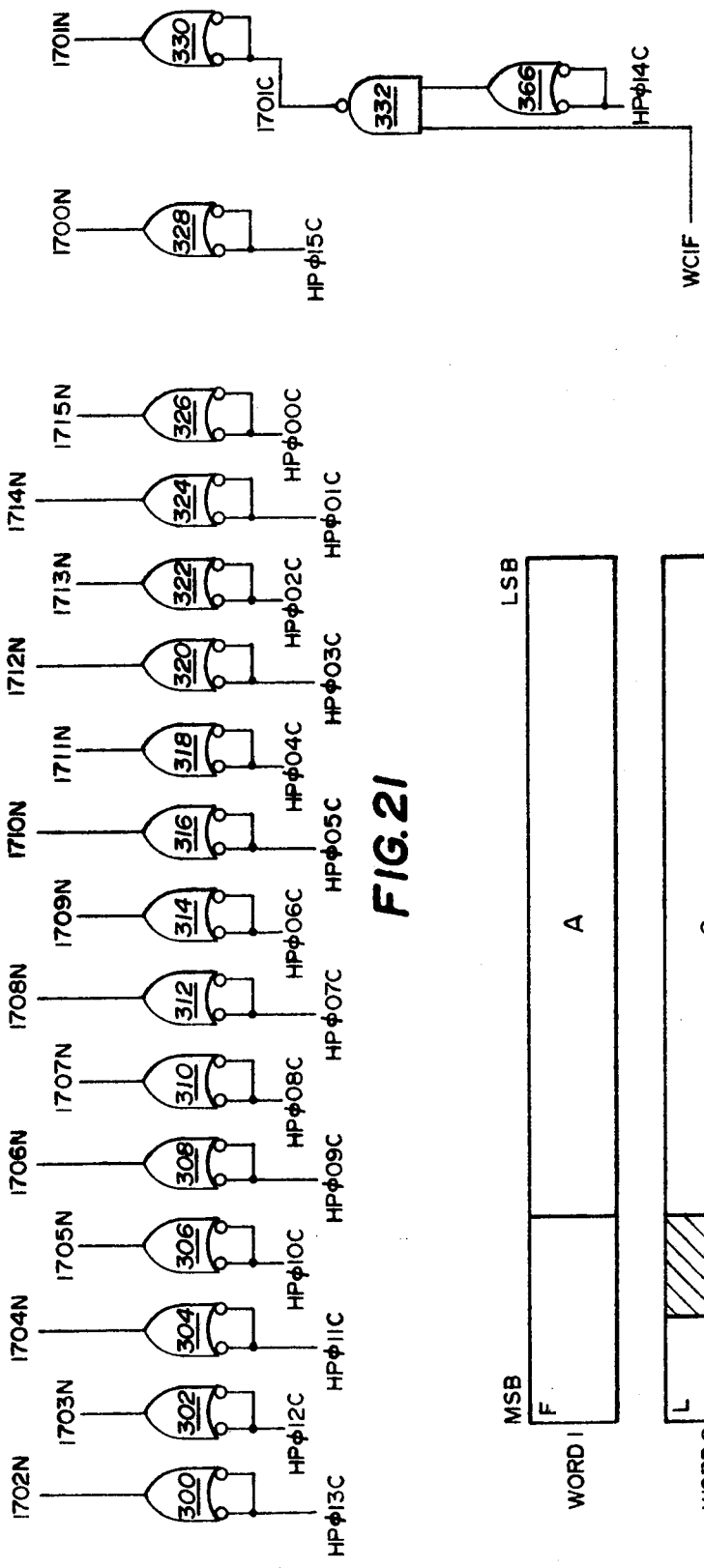
FIG. 20 is a diagrammatic illustration of two 16-bit data words utilized in the invention.
FIG. 21 is a block diagram of formating circuitry utilized in the logic drawer 76 shown in FIG. 10.

FIG. 20 illustrates the two 16-bit data words utilized to effect transfer between the two computers. No matter which computer initiates the data transfer, the initialization information transfer by the initiating computer is formated in a like manner. The A and C fields of the data word are both 14 bits wide and define the following information in the computer receiving the initialization data:

A field—memory address to/from which the desired transfer is to start;

C field—number of 16-bit data words to be transferred;

F field—control information from the computer originating the transfer request; and L field—definition of the requested transfer of either an input (1) to, or an output (0) from, the computer 78.

The interfacing to the TI—2540 computer is performed through the DMA channel 7 of the computer. The interfacing to the Hewlett-Packard 2115 computer is performed through a Hewlett-Packard standard channel (HP part number 02116–6195, interface kit 12554A–M11) which is plugged into the HP2115 channel 11.

FIG. 21 illustrates the logic circuits for formulating output data from the Hewlett-Packard 2115 computer 72 into data for inputting into the TI–2540 computer 78. The circuit comprises 16 OR-gates 300–330 for inverting the Hewlett-Packard computer 72 outputs HP015C–HP00OC into computer 78 inputs 1700N–1715N. A gating circuit is provided for gate 330 to prevent control information utilized during sequencing from being input into the computer 78. Sequencing signals WCIT from the circuit of FIG. 8 are fed into a NAND-gate 332, while an output from an OR-gate 334 is also fed to gate 332. Signal HP014C is applied to the input of gate 334.

Figure 22:
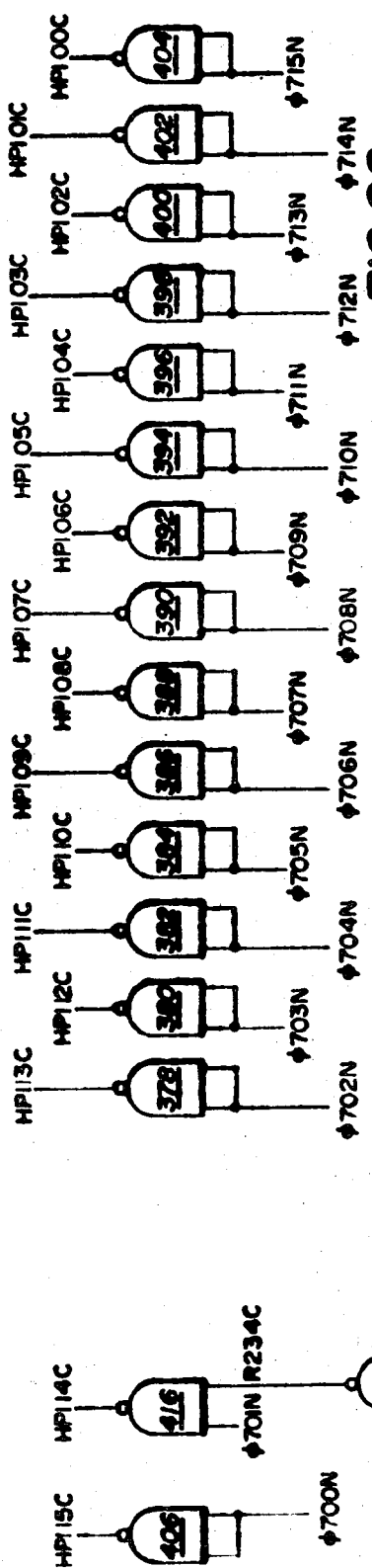
FIG. 22 is a block diagram of formating for transforming the outputs from computer 78 into inputs for computer 72 shown in FIG. 10.

FIG. 22 shows logic circuitry for transferring the outputs from the TI computer 78 into inputs for the Hewlett-Packard computer 72. The circuitry comprises 16 NAND gates, 14 of which are shown as gates 378–404, which format the TI computer 78 outputs 07OON–0715N into Hewlett-Packard inputs HP115C–HP100C.

Figure 23:
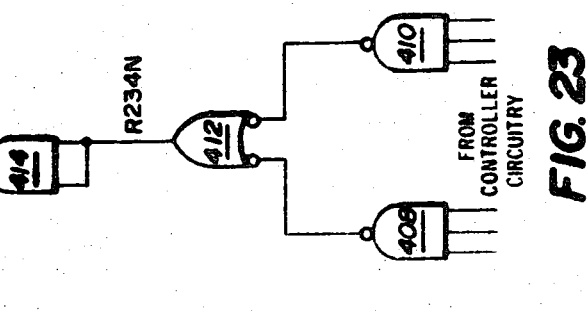
FIG. 23 is a block diagram of additional portions of the formating circuitry shown in FIG. 22.

FIG. 23 illustrates the formatting circuitry for the remaining two bits of the formatted word shown in FIG. 22, with gating circuitry being included in order to gate control data from the Hewlett-Packard computer 72. A NAND-gate 406 formats the TI computer 78 output 07OON into an input signal HP115C for the Hewlett-Packard computer 72. Control signals are fed into the inputs of NAND-gates 408 and 410 which are connected to an OR-gate 412. OR-gate 412 controls a NAND-gate 414 which is connected to a NAND-gate 416. Gate 416 formats the signal 07O1N into an input signal HP114C for the Hewlett-Packard computer 72.

Figure 24:
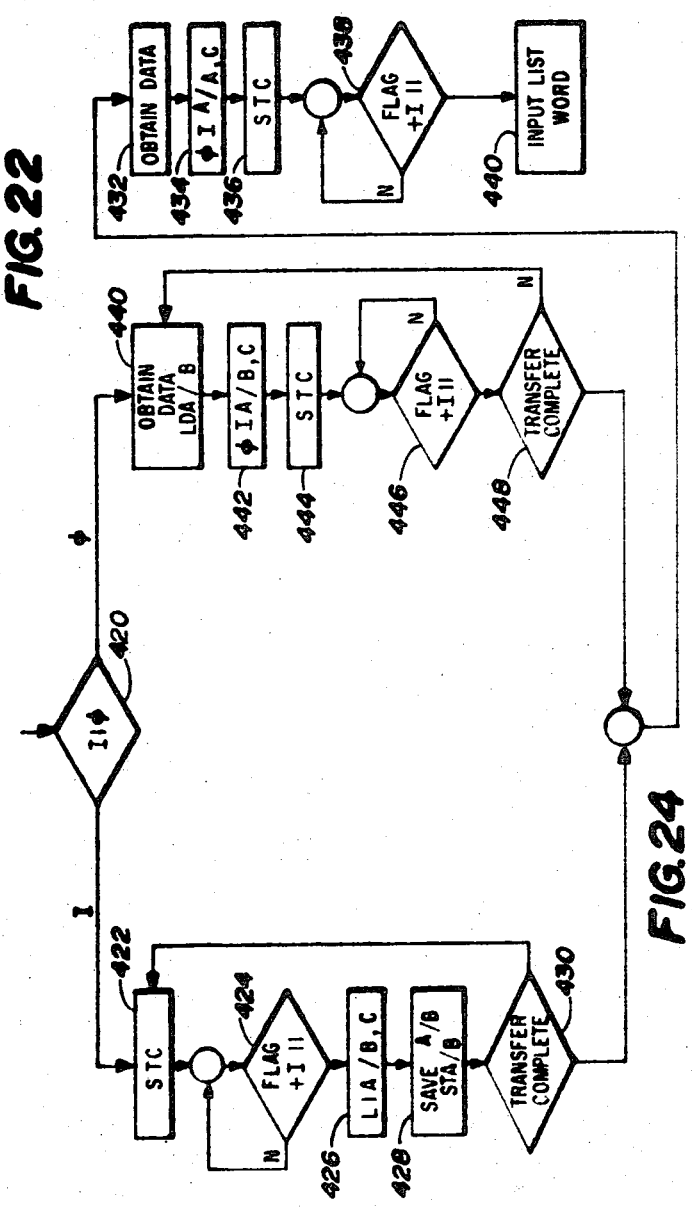
FIG. 24 is a flow chart of accomplishment of data transfer between computers 72 and 78 shown in FIG. 10.

FIG. 24 illustrates a suitable computer program flow chart for computer 72 for the accomplishment of data transfer between computers 72 and 78. An input to the Hewlett-Packard computer 72 is provided at 420 and utilized to set channel 11 of the computer at 422. An indication of the interruption of channel 11 is provided at 424, with a flag applied. If channel 11 is interrupted, the input is loaded into A or B at 426. A/B is saved and stored at 428. An indication of completeness of the transfer is provided at 430. If the transfer is complete, data is obtained at 432 and the data is put into a channel register 434. The channel is set at 436, and an indication of the interruption of channel 11 is provided at 438. The list words are input at 440.

During an output from the computer 72, data is obtained from memory at 440 and is put into a channel register 442. The control line on the output of the channel is set at 444, with an indication of the interruption of channel 11 being provided at 446. An indication of the complete transfer is provided at 448.

Computer 72 is thus informed of the receipt of a channel 7 interrupted by the computer 78, and is informed of the execution of the input of the data word 1 to the computer 78 by receipt of a channel 11 flag and/or interrupt signal. Upon receipt of the channel 11 interrupt, the data word 2 will be loaded into the channel 11 output data register. The completion of the transfers of the data word 2 implies that both computer 72 and 78 desire a transfer to be executed. Thus, the computer 78 can now activate its channel 7 for the type of transfer described in the data words 1 and 2. The computer 72 in turn sets up to execute the described data transfer. The F-field of data word 1 is not transferred to computer 78 since that field carries information of use only to the interface hardware.

P-CHANNEL INPUT INTERFACE LOGIC DRAWER 56

Figures 25, 26:
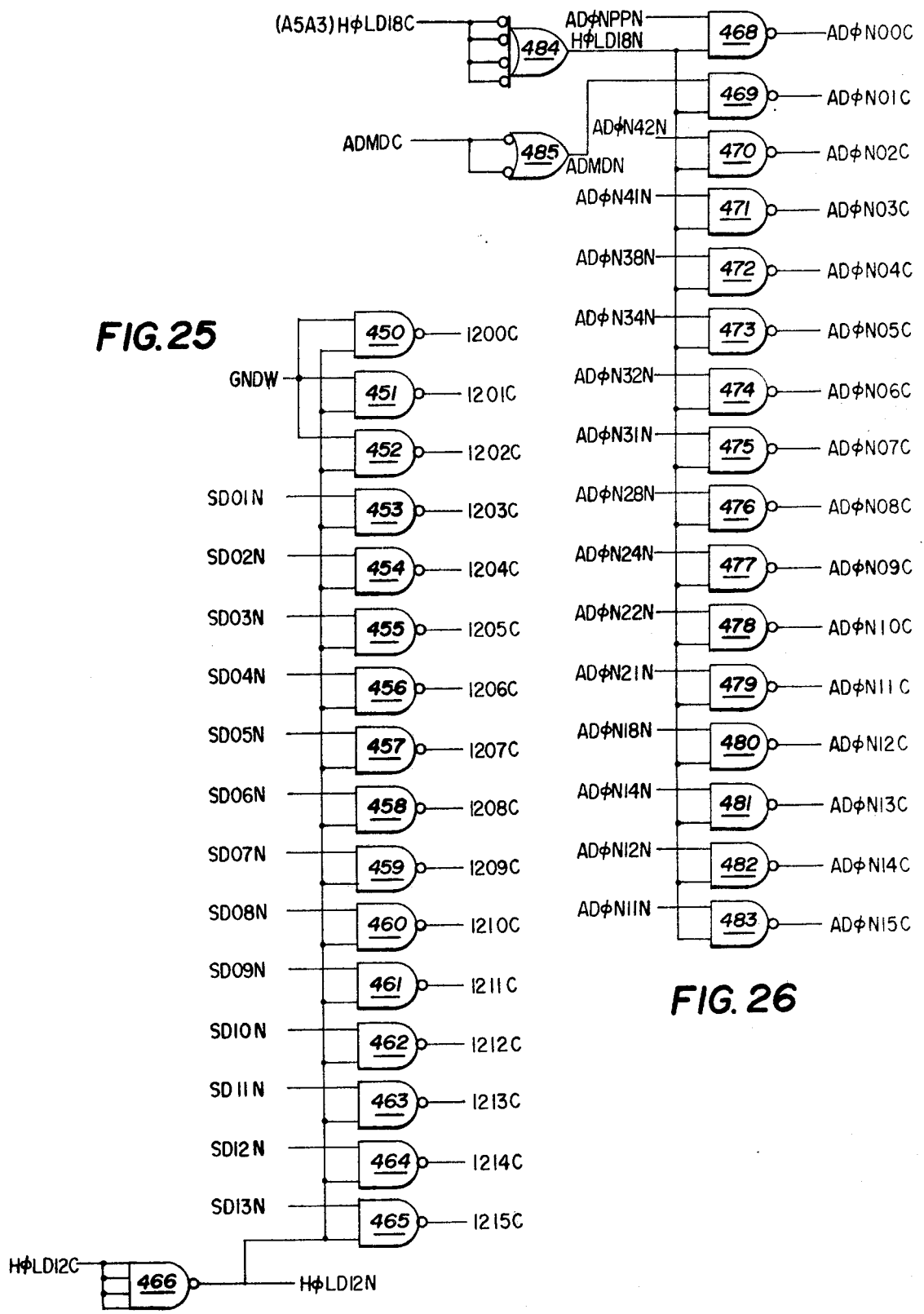
FIG. 25 is a block diagram of formating circuitry between the synchrodigital converter 52 and the computer 78 shown in FIG. 10.
FIG. 26 is formating circuitry for transferring On Course data between the acoustic doppler 54 and the computer 78 shown in FIG. 10.

FIG. 25 illustrates format circuitry for formatting digital signals from the synchrodigital converter 52 to the input of the computer 78. The format circuitry comprises 16 NAND-gates 450–465, each gate having an input commonly connected to the output of a NAND-gate 466, upon which appears the signal H0LD12N. Digital signals GNDW–SD13N are respectively applied to the remaining inputs of the gates 450–465, with the resulting outputs 1200C–1215C being provided for input to the computer 78.

FIG. 26 illustrates formatting circuitry for translating On Course data from the acoustic doppler system 54 into digital signals for input into the computer 78. Some decoding (not shown) is provided prior to this format circuitry to decode the output of the acoustic doppler 54 from four bits to one bit for application to the circuitry of FIG. 26. The formatting circuitry comprises 16 NAND-gates 468–483. One input of each of these gates is commonly connected to the output of an OR-gate 484 which provides the signal H0LD18N thereto. The signal ADMDC from the acoustic doppler 54 is applied through the OR-gate 485 to the input of gate 469. Similarly, acoustic doppler signals AD0N42N–AD0N11N are respectively applied to the inputs of the gates 470–483. Outputs AD0NOOC–AD0N15C are output by the gates for input into the computer 78.

Figure 27:
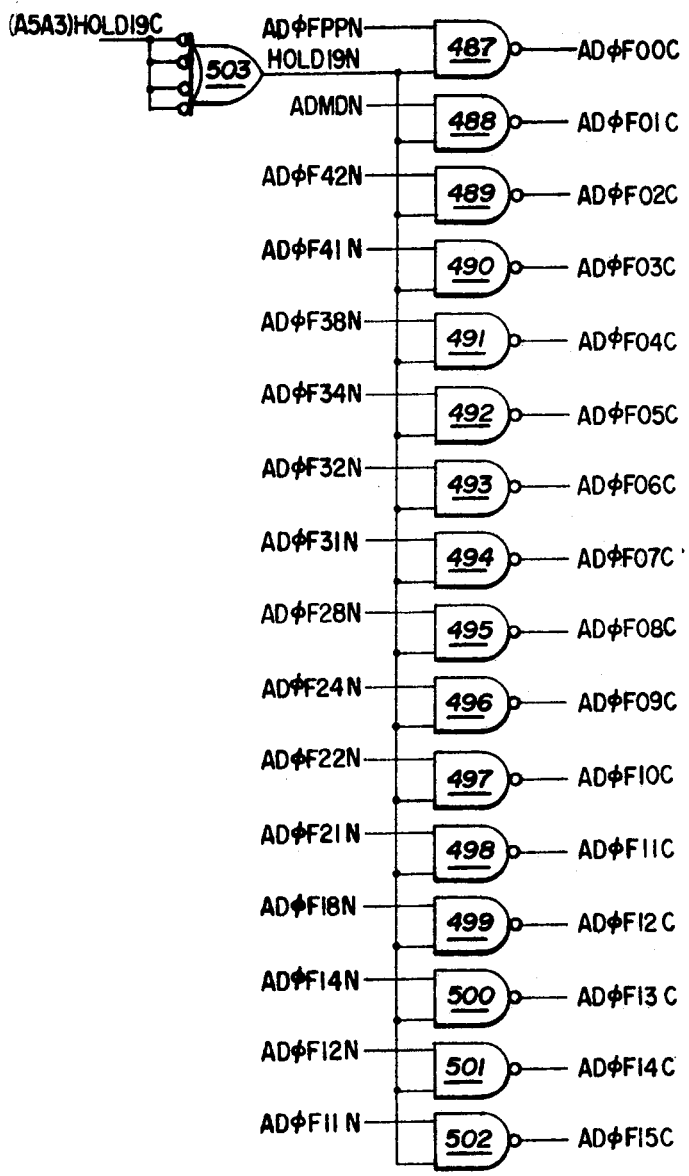
FIG. 27 is formating circuitry disposed between the acoustic doppler 54 and the computer 78 for formating Course data.

FIG. 27 illustrates formatting circuitry located in the logic drawer 56 between the acoustic doppler 54 and the computer 78 for formatting Off-course data from the acoustic doppler. The formatting circuitry comprises 16 NAND-gates 487–502, each having an input commonly connected to the output of an OR-gate 503. The signal H0LD19N is applied by gate 503 to the gates 487–502. Off-Course output signals, which have been decoded from four bits to one bit as previously noted, AD0FPPN–AD0F11N are input respectively into gates 487–502. Formatted signals AD0FOOC–AD0F15C are thus provided by the formatting circuitry for input into the computer 78.

Figure 28:
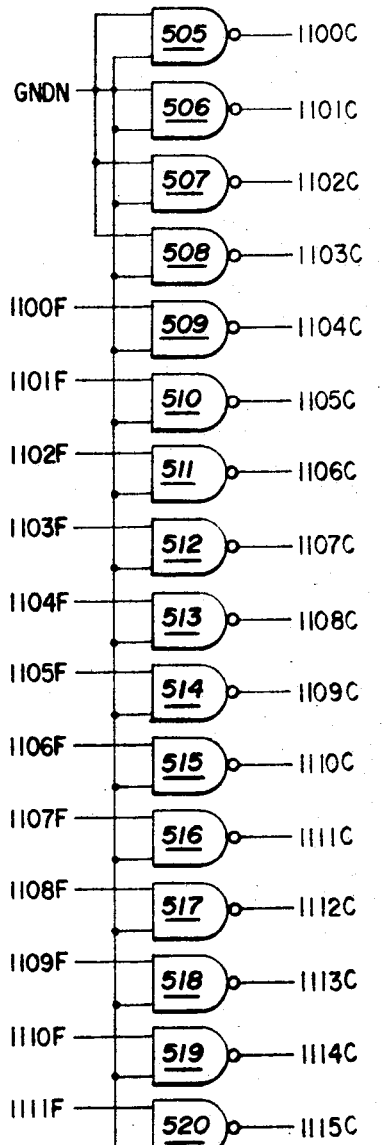
FIG. 28 is formating circuitry disposed between the EM log 60 and the computer 78 shown in FIG. 10.
Figure 28:
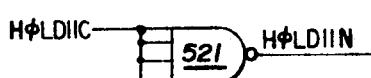

FIG. 28 illustrates formatting circuitry for translation of the output signals from the EM log 60 into the input of the computer 78. The formatting circuitry comprises 16 NAND-gates 505–520, each having an input commonly connected to the output of a NAND-gate 521 to receive the signal H0LD11N. In a similar manner as the formatting circuitry previously described, the inputs of the gates 505–520 are fed output signals GNDW–1111F from the EM log. The outputs of the gates thus provide signals 1100C–1115C for input into computer 78.

Figure 29:
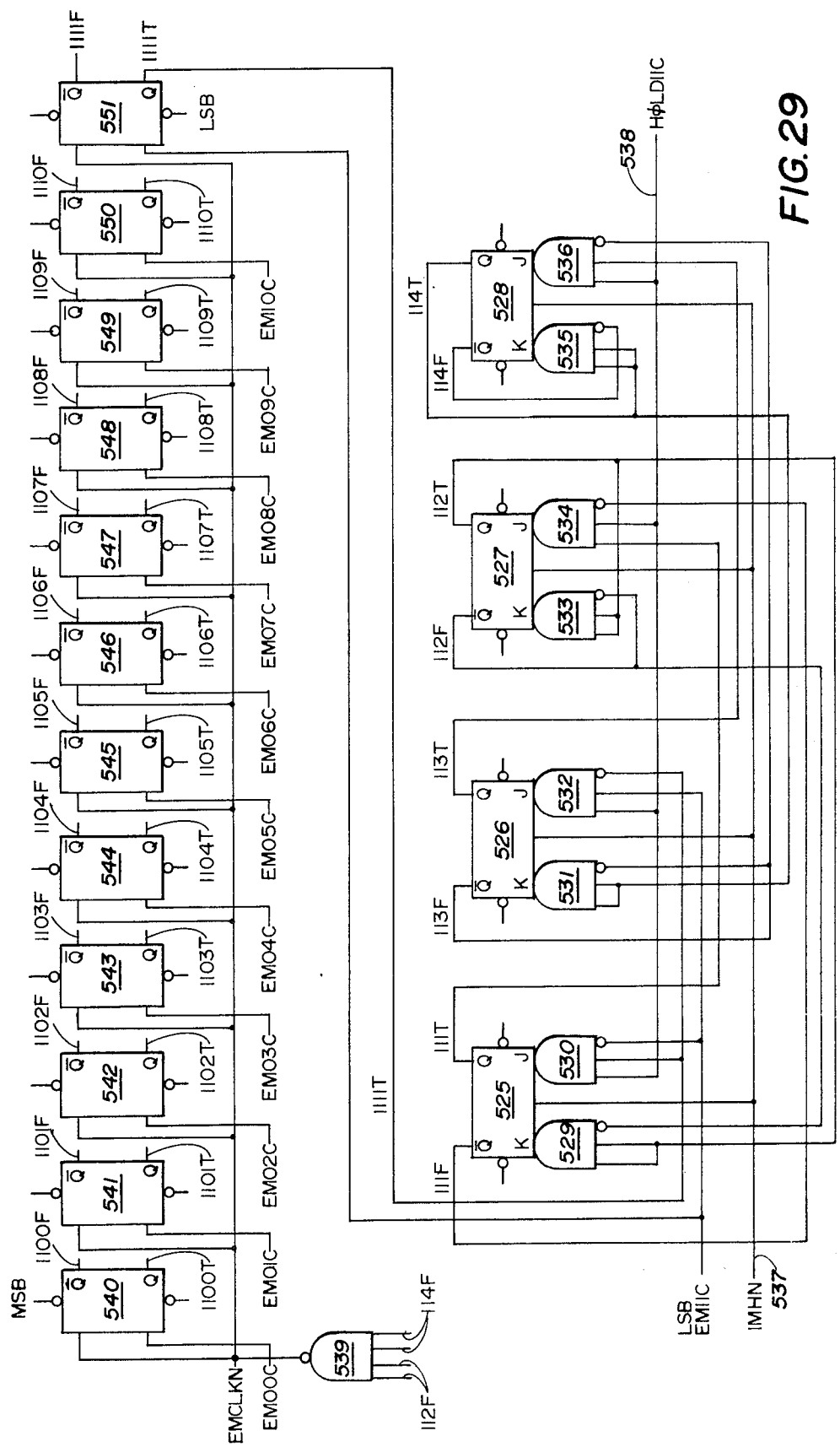
FIG. 29 is a logic diagram of clocking and storing circuitry in the logic drawer 56 shown in FIG. 10.

FIG. 29 illustrates clocking and storing circuitry for sequentially inputting changes from the EM log into the formatting circuitry shown in FIG. 28. This circuitry does not permit new data from the EM log to the input to the computer 78 until a steady EM log output has been provided, thereby preventing erroneous data from being input into the computer 78.

The circuitry includes four flip-flop circuits 525–528, with NAND-gates 529–536 respectively connected to the K and J terminals of the flip-flop circuits. A 1-megacycle clock signal is applied to each of the flip-flop circuits via the lead 537. A hold signal H0LD11C is applied via lead 538 to gates 530, 532, 534 and 536 in order to disable the four flip-flop circuits when the computer 78 is interrogating the least significant bit of the stored data words on the EM log.

The False outputs from the flip-flop circuits 527 and 528 are applied to the inputs of a NAND-gate 539 in order to provide a signal EMCLKN which is applied to a clock input of twelve bistable register circuits 540–551. Circuit 540 is utilized to store the most significant bit of the data words from the EM log 60, while circuit 551 is utilized to store the least significant bit therefrom. Inputs from the EM log EMOOC–EM1OC are applied to circuits 540–550, while the least significant bit EM11C is applied to the circuit 551. The $\bar{Q}$ outputs of each of the stored circuits 540–551 provides signals 11OOF–1111F which are applied to the formatting circuitry shown in FIG. 28 for input to the computer 78.

In operation of the circuit of FIG. 29, the last data word from the EM log 60 is stored in the circuits 540–551. The flip-flop circuits 525–528 do not permit the circuits to register a change until variances in the EM log output have settled out. When the least significant bit of the data word from the EM log is greater than the least significant bit stored in the circuit 551, flip-flops 526 and 528 are set. One microsecond later, flip-flop circuits 525 and 527 are set to trip the new data word into the circuits 540–551. Alternatively, if the least significant bit output from the EM log is different from the least significant bit stored in the circuit 551, flip-flop circuits 525 and 527 go set, and then 1 microsecond later flip-flop circuits 526 and 528 are set to trip the new data in. The data tripped into the register circuits 540–551 are stored therein until a change in the least significant bit of the output from the EM log is sensed.

FIG. 30 illustrates the interface circuitry in the logic drawer 56 between the VLF receivers and the computer 78. It will be understood that similar circuitry as shown in FIG. 30 will be provided for each of the VLF receivers, only one complete circuit being shown for simplicity of description. The circuit comprises three flip-flop circuits 556–560, each being provided with a 2-megacycle clock signal via lead 562. A pair of NAND-gates 564 and 566 are respectively connected to the K and J terminals of each of the flip-flop circuits. An OR-gate 568 gates the outputs of NAND-gates 570 and 572 to an input of the gate 566 for the flip-flop circuit 556. An OR-gate 574 receives the signal H0LD14C and the false outputs of flip-flop circuits 558 and 560.

An OR-gate 576 gates the outputs from NAND-gates 578 and 580 into the flip-flop 558. Similarly, an OR-gate 582 gates the outputs of the pair of NAND-gates 584 and 586 into the flip-flop circuit 560. The signal V2UCN is fed directly to the input of gate 586 and also to a NAND-gate 588. The signal V2DCN is fed directly to the input of gate 578 and also to the input of a NAND-gate 590. An OR-gate 592 is connected to the inputs of gates 564 of both flip-flop 558 and 560.

An OR-gate 594 feeds to an input of a NAND-gate 596 which in turn is connected to an OR-gate 598 which generates the signal VRESN. This signal, along with V2PRN, is fed to the input of a NAND-gate 600 which in turn is connected to an OR-gate 602. The output of gate 602 is applied to gates 580 and 584. V2PRN, along with the true output of flip-flop 558 and the false output of flip-flop 550, is applied to a NAND-gate 604. Similarly, V2PRN, along with the false output from flip-flop 558 and the true output from flip-flop 560, is applied to the input of a NAND-gate 606. The output of gate 604 is applied through an OR-gate 608, while the output of gate 606 is applied through an OR-gate 610.

In operation of the circuitry shown in FIG. 30, an indication of the carrier level of the VLF signal from a particular receiver is stored in flip-flop 556. The output V2AT from flip-flop 556 is a logic one when the amplitude is sufficiently high. An indication of a Down Count is stored by the flip-flop circuit 558. This indication of a Down Count means that the particular VLF receiver requires a decrement in phase by 0.1 microsecond. An indication of an Up Count is stored by the flip-flop circuit 560, which provides an indication when an increment by phase by 0.1 microsecond is required. A receiver priority signal V2PRN, which is fed from priority circuitry to be subsequently described, indicates that the present receiver has the present highest priority for input into the computer 78.

Only one VLF receiver is allowed to input into computer 78 at a time. The signal V2YDC is indicative of a required Down Count for the second receiver, while the signal V2YUC is indicative of a required Up Count for the second receiver. An acknowledge signal AKC, received from the processor bus interface logic circuitry to be subsequently described, is fed to gate 594. The resulting signal VRESN fed to gate 600 is a reset signal to reset each of the flip-flops 558 and 560 after input into the computer.

FIG. 31 illustrates the priority network for determining the particular priority of VLF receivers which are input to the computer 78. The Up and Down Counts from each of the VLF receivers are respectively fed into the inputs of OR-gates 620, 622 and 626. The outputs of gates 620–624 are respectively fed into inputs of NAND-gates 628–632. Other inputs into the gates 628–632 are tied to the True output of a flip-flop circuit 634 and to the inputs of NAND-gates 636 and 638. The output of gate 626 is also fed to the inputs of gates 636 and 638. The False output of the flip-flop circuit 634 is fed to an OR-gate 640. The True output of the flip-flop circuit 634 is fed into the inputs of OR-gates 642, 644 and 646. The outputs of gates 628–632 are also fed into inputs or respective ones of the gates 642–646. A 2-megacycle clock signal is fed to the flip-flop circuit 634.

In operation of the priority network shown in FIG. 31, the Up and Down Counts from the various receivers are fed through the gates 620–624. When there is a required phase count from any receiver, an interrupt signal is generated by the flip-flop circuit 634. The output of the gate 642 is provided with the highest priority ranking, and thus any change in phase detected by the first VLF receiver is fed first into a computer 78. Subsequent changes in the phase of the other VLF receivers are given lower priorities for subsequent feeding into computer 78.

FIG. 32 illustrates formatting circuitry for formatting the outputs from the VLF receivers into suitable form for input into the computer 78. The circuitry comprises 16 NAND-gates 650–680, each having an input commonly connected to the output of a NAND-gate 682. The input of gate 682 is connected to receive a signal from the processor bus interface circuitry, to be later described, to indicate the particular VLF receiver being interrogated by the computer 78. The other inputs of gates 650–662 are commonly tied to receive the signal GNDW. The remaining inputs of gates 664–680 respectively receive the signals A5A3V3AT–VIYUN. The resulting signals A5A31400C–AA31415C are generated by the circuit for feeding into the computer 78.

FIG. 33 illustrates a portion of the processor bus controller circuit which provides sequencing and the synchronizing for the various sensor inputs within the logic drawer 56. The circuitry shown in FIG. 33 comprises a pair of flip-flop circuits 686 and 688, each of which are synchronized with a 2-megacycle clock via lead 690. Each of the flip-flop circuits has associated respectively therewith a pair of NAND-gates 692 and 694. A plurality of signals CAXO2N–CAX15N, RQN and ABO5C are input to a NAND-gate 696 which provides an output PEC which is fed to a flip-flop circuit 686 and also to a NAND-gate 698. Sixteen NAND-gates 700–730 provide 16 outputs ABO6C–ABO5C. The output of gate 698 is connected to the inputs of gate 700, 704, 708, 712, 716, and 720–730. The signal VCCW is applied to the inputs of gates 702, 706, 710, 714 and 718. Signals CAXO7N–CAXO6N are respectively applied to the inputs of gates 700, 704, 708, 712, 716 and 720–730.

In operation of the circuitry shown in FIG. 33, the flip-flop circuit 688 serves to synchronize the fact that the system is in a transfer state. The flip-flop circuits 686 synchronizes the signal PEC to the interface clock. This circuit enables the computer 78 to execute a single transfer to the device having the particular address provided by the gates 700–730.

FIG. 34 discloses additional circuitry of the processor bus controller comprising flip-flop circuits 740–746, each flip-flop circuit having associated therewith NAND-gates 748 and 750. A 2-megacycle clock signal is fed to the flip-flop circuit 746 and to the input of a NAND-gate 752. The clock output from the gate 752 is fed to control the operations of the flip-flop circuits 740 and 742, as well as to the input of a four flip-flop circuit 754. Four NAND-gates 758–764 provide signals which are gated by an OR-gate 766 and fed to the flip-flop 746.

The True output of the flip-flop 742 is fed to the flip-flop circuit 740 and also to the input of a NAND 770 connected to the J terminal of the flip-flop circuit 754. The other input of gate 770 is connected to the True output of the flip-flop circuit 740. A signal PEF and PITF are fed through a NAND-gate 772 to the K terminal of the flip-flop circuit 754. The Q of the output of the flip-flop circuit 754 is fed through a NAND-gate 774 to provide the signal PITN. The False output of the flip-flop circuit 746 is fed to an input of a NAND-gate 776.

Signals PBG0T and PET are also gated by the gates 776 to provide an output which is fed through an OR-gate 778. The False output from the flip-flop circuit 740 is fed into another input of the gate 778. The False output of the flip-flop circuit 740 is also fed through an OR-gate 780 to provide the control signal AKN. The True output from the flip-flop circuit 740 is fed through a NAND-gate 782 to provide the control signal AKC which is utilized in the circuitry shown in FIG. 30. The flip-flop circuits 740 and 742 operate upon the synchronous signals, while the flip-flop circuit 746 synchronizes the signal RDYN fed from the gate 766 to the 2-megacycle clock.

FIG. 35 illustrates gating circuitry within the processor bus controller circuitry in the logic drawer 56 for providing sequential inputs to computer 78 from selected ones of the sensors. Bias voltage VCC, which in the preferred embodiment is 5 volts, is fed through resistors 800–830 to create a wired OR function. The circuit further comprises 16 gates 832–862, each of the gates having one input commonly connected to receive signal DEN. The remaining inputs of the gates 832–862 are connected to receive the signals OOC–15C, respectively. The outputs from the resistors 800–830 are respectively connected to ones of the signals OOC–15C.

In FIGS. 33–35, some conventional addressing circuitry has been omitted for simplicity of description. The signal OOC fed to gate 32 provides a gate for each bit zero for a particular device input. The signal O1C serves as bit one for each device input and so on. With the present circuitry, only one sensor output will be addressed by the processor bus circuitry at one time such that the computer 78 sequentially receives one word at a time from selected ones of the sensors.

OPERATION OF COMPUTER 78

FIG. 36 is a basic flow diagram of the operation of computer 78 upon the various inputs of the sensors. Four generally periodic interrupts are provided to the operation of the computer, the interrupts occuring at approximately 10 milliseconds, ½ to 1 second, 2 minutes, and a satellite fix interrupt which occurs at a varying time but which may be assumed for purposes of description to average about 2 hours. Two additional interrupts, the VLF interrupt and the VLF update for each receiver, are also provided.

During the 10-milliseconds interrupt, the gyrocompass, water speed and doppler sensors are read at 900. The sine and cosine of the gyrocompass heading is computed at 902. The north and east components of the water speed are computed at 904. The relative motion of the doppler and the water speed is accumulated at 906 and output at 908.

During the ½-to one-second interrupt, data is collected from the stored data and frozen at 910. Data is collected from the accumulation at 906, and also is accumulated from the updating of the VLF intercept of the VLF counters at 912. At 912, the status of the VLF counters are set on/off and the VLF update is then output at 914. If a sensor state change has occurred, the optimum weights provided to the sensor inputs are recomputed at 912 in the manner previously described. Filtering and correlation of the VLF signals is also provided at 912. The optimum position is computed from the last 2-minute fix at 914. The computed position is displayed at 916. The relevant functions of position, time and velocity are computed at 918 and displayed at 920. The program is ended at 922.

At each 2-minute interval, the predicted VLF readings at the present position during the next 2-minute period is computed at 924. The prediction from the last 2-minute interrupt to the present time and position is updated at 926. The optimum weights are computed at 928 and the optimum position is computed at 930. The position time and VLF readings in the list are saved at 932 and are provided to the ½-to 1-second interrupt program at 918.

The VLF update for each receiver program includes scaling down of the present VLF least mean square matrix at 934 in the manner well known in the art. The least mean square matrix for the list data is conventionally computed at 936 and is added to the present matrix. The preselected normal equations are solved at 938 and the parameters for each receiver are updated. The program exits at 940.

The satellite fix interrupt receives the data from computer 72 at 942. The satellite fix time is found in the save list of 932 at 944. The fix error is distributed linearly back to the previous satellite fix at 946. This distribution is provided via a data link to the VLF update program at 936. The VLF update program is started at 948 and the program exits at 950.

It will thus be seen that the present invention is directed to an extremely accurate and reliable navigation method and system particularly suited for seismic exploration. The large number of different individual sensors of the invention allows accurate navigation data to be generated at all times and in all weather situations. In conjunction with the optimal data processing of the invention, data more accurate than any single sensor is consistently provided.

Although the present invention has been described with the utilization of two interconnected digital computers, it will be understood that in some embodiments of the invention a single large capacity digital computer could be alternatively utilized. Alternatively, in place of the properly programmed general purpose digital computers disclosed in the invention, suitable analog or digital hardware components could be utilized to provide the analysis and correction functions provided by the computers.

Whereas the present invention has been described with respect to a specific embodiment thereof, it will be understood that various modifications and changes will be suggested to one skilled in the art, and it is intended to encompass these changes and modifications as fall within the true scope of the appended claims.

What is claimed is:

1. A navigational system for a vehicle comprising:
   at least one sensing system for generating a signal indicative of the absolute position of the vehicle,
   at least one other sensing system for generating a signal representative of the position of the vehicle relative to a reference location, and
   means for applying optimum weighting coefficients to said signals to vary the amplitude thereof, said weighting coefficients being determined in accordance with measurement error statistics of the respective systems and statistics of position determination to generate a resultant navigational signal having a minimum mean squared error thereby locating the absolute position of said vessel within a significantly reduced circle of error probability.

2. The system of claim 1 wherein said one sensing system comprises receivers for intermittently receiving radio signals transmitted from an orbiting satellite.

3. The system of claim 2 and further comprising:
   radio navigation means for generating navigation data in response radio signals received from fixed transmitting stations.

4. The system of claim 3 and further comprising:
   gyrocompass means for generating substantially real time representations of the vessel position relative to a location determined by said radio signals transmitted from the orbiting satellite.

5. The system of claim 4 and further comprising:
   means for comparing the output signals from said radio navigation means and said gyrocompass means to generate an error signal, and
   means for correcting the resultant navigational signal in response to said error signal.

6. The system of claim 3 and further comprising:
   means for correcting the output of said radio navigation means according to predetermined diurnal variations.

7. A navigation system comprising:
   means for generating position signals in response to reception of radio signals transmitted from known locations, said means including a satellite navigation system and a VLF radio navigation system,
   sensor means for generating speed and heading signals,
   means for combining said position signals and said speed and heading signals to produce a resultant navigational signal having a minimum mean squared error,
   means for comparing the position signals with said speed and heading signals to generate an error signal, and
   means responsive to said error signal for correcting said resultant navigation signal.

8. The navigation system of claim 7 wherein said means for generating speed and heading includes:
   means for generating indications of water speed,
   gyrocompass means, and
   doppler radar means.

9. The navigation system of claim 7 wherein the means for comparing signals determines varying weighting coefficients for each signal according to the sensed relative accuracy of said resultant navigation signal.

10. The navigation system of claim 7 wherein said means for combining the position signals with the speed and heading signals comprises a digital computer.

11. The navigation system of claim 7 wherein said position and speed and heading signals are varied by weighting coefficients having magnitudes determined by a minimum mean square error function, said function being dependent upon the relative accuracy of said means for generating position signals, said means for generating speed and heading signals, and the time interval between satellite radio signals.

12. The navigation system of claim 7 and further comprising:
   first digital computer means responsive to the reception of radio signals from an orbiting satellite to generate digital signals representative of the absolute position of the vessel, and
   second digital computer means responsive to the output of said first digital computer means, said radio navigation means and said sensor means for generating said resultant navigation output.

13. A method of navigation comprising:
   generating a first signal representative of the absolute position of a vehicle,
   generating a second signal representative of the position of the vehicle relative to a fixed known location,
   varying the magnitude of said first and second signals by applying weighting coefficients determined in accordance with preselected criteria including measurement error statistics associated with said first and second signals and statistics of position determination, and
   generating a minimum mean squared error resultant output navigation signal in response to the weighted first and second signals, said output navigational signal defining the absolute position of said vehicle in terms of latitude and longitude with a greater accuracy and reliability than either one of said first or second signals independently.

14. The method of claim 13 wherein said preselected criteria is further characterized as comprising:
   a fixed relationship between the accuracy of said first and second signals, the speed of the vehicle, and the time intervals between new position fixes provided by said first and second signals.

15. The method of claim 14 wherein said first signal is generated in response to radio signals received from fixed remote locations.

16. The method of claim 14 wherein said second signal is generated in response to indications of the vehicle speed and heading.

17. The method of claim 14 and further comprising:
   sensing said first and second signals, and
   decreasing the weighting of said signals in case of inaccuracies or inconsistencies induced by external factors.

18. The method of claim 13 wherein said first signal is generated in response to signals received from an orbiting satellite.

19. An all weather navigational system for accurately plotting the absolute location of a vessel comprising:
   a first sensing system for periodically receiving radio signals from an orbiting satellite to thereby accurately locate the absolute position of said vessel at a given point in time,
   a second sensing system including an EM log, gyrocompass, and VLF receivers to provide continuous navigation information during the interval between satellite signals, and
   means for combining signals from said first and second systems to provide a resultant minimum means squared error navigational signal that accurately plots a trajectory of the absolute position of the vessel between satellite signals, said combination of signals being effected by the determination of optimum weighting coefficients to be applied to each sensor output considering measurement error statistics of the respective sensors and statistics of the position determination.

20. A navigational system as set forth in claim 19 wherein said means for combining the signals from said first and second sensing systems include:
   a first digital computer responsive to the reception of radio signals from said orbiting satellite;
   a second digital computer responsive to the output of said first digital computer and said second sensing system, and
   formatting circuitry for translating the outputs of said first and second sensing systems to digital signals for inputs to said computers.

* * * * *